(12) United States Patent
Kano

(10) Patent No.: US 12,280,559 B2
(45) Date of Patent: Apr. 22, 2025

(54) METHOD FOR MANUFACTURING PACKAGING FOR POUCH CONTAINER, AND DEVICE FOR MANUFACTURING PACKAGING FOR POUCH CONTAINER

(71) Applicants: FUJI SEAL INTERNATIONAL, INC., Osaka (JP); KAO CORPORATION, Tokyo (JP)

(72) Inventor: Takao Kano, Osaka (JP)

(73) Assignees: FUJI SEAL INTERNATIONAL, INC., Osaka (JP); KAO CORPORATION, Tokyo (JP)

( * ) Notice: Subject to any disclaimer, the term of this patent is extended or adjusted under 35 U.S.C. 154(b) by 90 days.

(21) Appl. No.: 17/919,920

(22) PCT Filed: Apr. 21, 2021

(86) PCT No.: PCT/JP2021/016186
§ 371 (c)(1),
(2) Date: Oct. 19, 2022

(87) PCT Pub. No.: WO2021/215476
PCT Pub. Date: Oct. 28, 2021

(65) Prior Publication Data
US 2023/0173782 A1 Jun. 8, 2023

(30) Foreign Application Priority Data

Apr. 23, 2020 (JP) ................................ 2020-076555

(51) Int. Cl.
B31B 70/14 (2017.01)
B31B 70/26 (2017.01)
(Continued)

(52) U.S. Cl.
CPC ............ B31B 70/14 (2017.08); B31B 70/261 (2017.08); B31B 70/64 (2017.08); *B31B 2155/00* (2017.08)

(58) Field of Classification Search
CPC ....... B31B 70/14; B31B 70/64; B31B 70/261; B31B 2155/00; B31B 70/20; B31B 70/26;
(Continued)

(56) References Cited

FOREIGN PATENT DOCUMENTS

JP 2014-193566 A 10/2014
WO WO-2018164117 A1 * 9/2018 ........... B31B 70/008

OTHER PUBLICATIONS

Jul. 6, 2021 International Search Report issued in Patent Application No. PCT/JP2021/016186.

* cited by examiner

*Primary Examiner* — Sameh Tawfik
(74) *Attorney, Agent, or Firm* — Oliff PLC

(57) ABSTRACT

A method for manufacturing a pouch-type packaging material includes: a first folding process; a first cutting process of cutting the top-side sheet material, a second sub-region, a first main region, and a first sub-region along a first cutting line that extends from a portion where the top-side sheet material and the second sub-region overlap to a portion closer toward a bottom side in a z direction beyond a first boundary line; a second folding process; a second cutting process of cutting the top-side sheet material, the first sub-region, the first main region, and a second main region along a second cutting line to form a top-side sheet from the top-side sheet material, where the second cutting line extends from a portion where the top-side sheet material and the first sub-region overlap to a portion closer toward the bottom side in the z direction beyond the second boundary line.

12 Claims, 32 Drawing Sheets

(51) Int. Cl.
*B31B 70/64* (2017.01)
*B31B 155/00* (2017.01)

(58) Field of Classification Search
CPC ... B31B 70/644; B31B 70/645; B31B 70/813; B31B 70/8132; B31B 70/8133
USPC .......................................................... 493/194
See application file for complete search history.

METHOD FOR MANUFACTURING PACKAGING FOR POUCH CONTAINER, AND DEVICE FOR MANUFACTURING PACKAGING FOR POUCH CONTAINER

TECHNICAL FIELD

The present invention relates to a method for manufacturing packaging for a pouch container, and a device for manufacturing packaging for a pouch container.

BACKGROUND ART

Pouch containers are widely used storage containers for various contents, such as detergents, beverages and foods. Pouch containers are typically formed with soft and flexible sheets of synthetic resin. Patent Document 1 discloses a method for manufacturing a pouch-type packaging material used for forming a conventional pouch container. The manufacturing method involves joining a pair of body sheet materials to a top-side sheet material. Each of the pair of body sheet materials and the top-side sheet material is a long continuous sheet, which is usable for fabricating a plurality of pieces of pouch-type packaging material in succession. Subsequently, a first cutting process is performed to partly cut the top-side sheet material while the pair of body sheet materials are held along a vertical direction and the top-side sheet material is held along a horizontal direction. In the first cutting process, the top-side sheet material is cut into the shape corresponding to a plurality of top-side sheets of a plurality of pieces of pouch-type packaging material. At this stage, each top-side sheet is not separated from an adjacent one. Subsequently, a second cutting process is performed while the pair of body sheet materials and the top-side sheet material are held along the vertical direction. In the second cutting process, portions of the pair of body sheet materials and the top-side sheet material forming a plurality of pieces of pouch-type packaging material are separated one by one in the sheet feed direction.

PRIOR ART DOCUMENT

Patent Document

[Patent Document 1] JP-A-2014-193566

SUMMARY OF THE INVENTION

Problem to be Solved by the Invention

In the conventional pouch-type packaging material described above, the side edges of each top-side sheet are formed by the cutting in the second cutting process. Since the second cutting process is performed for separating a continuous sheet material into a plurality of pieces in the feed direction, the pair of body sheet materials and the top-side sheet material are cut along a straight line extending in the vertical direction. The shape of the side edges of the top-side sheet is therefore limited, which may be undesirable.

The present invention has been conceived in view of the circumstances described above and aims to provide a method and a device for manufacturing a pouch-type packaging material which can increase the design flexibility for the shape of the top-side sheet.

Means to Solve the Problem

A first aspect of the present invention provides a method for manufacturing a pouch-type packaging material from a first body sheet material and a second body sheet material disposed face-to-face in a first direction, and a top-side sheet material disposed on a top side of the first body sheet material and the second body sheet material in a second direction perpendicular to the first direction. The method includes: a sheet joining process of joining a first main region of the first body sheet material and a second main region of the second body sheet material to provide a pair of side seals spaced apart from each other in a third direction perpendicular to the first direction and the second direction, and joining a first sub-region of the first body sheet material, a second sub-region of the second body sheet material, and the top-side sheet material to provide a top-side seal, the first sub-region being located on the top side of the first main region in the second direction, the second sub-region being located on the top side of the second main region in the second direction; a first folding process of making a valley fold along a first boundary line between the first main region and the first sub-region so that the first main region and the first sub-region overlap; a first cutting process of cutting the top-side sheet material, the second sub-region, the first main region, and the second main region along a first cutting line that extends from a portion where the top-side sheet material and the second sub-region overlap to a portion closer toward a bottom side in the second direction beyond the first boundary line; a second folding process of making a valley fold along a second boundary line between the second main region and the second sub-region so that the second main region and the second sub-region overlap; and a second cutting process of cutting the top-side sheet material, the first sub-region, the first main region, and the second main region along a second cutting line to form a top-side sheet from the top-side sheet material, the second cutting line extending from a portion where the top-side sheet material and the first sub-region overlap to a portion closer toward the bottom side in the second direction beyond the second boundary line so as to intersect a first outline that is formed in the first cutting process.

In a preferred embodiment of the present invention, the method further includes a third cutting process of cutting, after the second cutting process, the first main region and the second main region along a pair of third cutting lines to form a first body sheet from the first body sheet material and a second body sheet from the second body sheet material, each of the pair of third cutting lines reaching a second outline that is formed in the second cutting process and also reaching a bottom edge of each of the first main region and the second main region in the second direction.

In a preferred embodiment of the present invention, in the third cutting process, the third cutting line is smoothly connected to a second outline that is formed in the second cutting process by cutting along the second cutting line.

In a preferred embodiment of the present invention, the first body sheet material, the second body sheet material, and the top-side sheet material are portions of one raw material sheet.

In a preferred embodiment of the present invention, the method further includes a process of preparing, before the sheet joining process, a laminate of a first structural sheet material and a second structural sheet material formed with a filler enclosing portion that is a region joined together for enclosing a filler. The sheet joining process includes joining the first structural sheet material and the second structural sheet material to an outer surface of the first body sheet material, the second body sheet material, and the top-side sheet material. The first folding process, the first cutting process, the second folding process, and the second cutting process are performed to fold and cut the first structural sheet material and the second structural sheet material together with the first body sheet material, the second body sheet material, and the top-side sheet material.

A second aspect of the present invention provides a device for manufacturing a pouch-type packaging material from a first body sheet material and a second body sheet material disposed face-to-face in a first direction, and a top-side sheet material disposed on a top side of the first body sheet material and the second body sheet material in a second direction perpendicular to the first direction. The device includes: a sheet joining unit that joins a first main region of the first body sheet material and a second main region of the second body sheet material to provide a pair of side seals spaced apart from each other in a third direction perpendicular to the first direction and the second direction, and that joins a first sub-region of the first body sheet material, a second sub-region of the second body sheet material, and the top-side sheet material to provide a top-side seal, the first sub-region being located on the top side of the first main region in the second direction, the second sub-region being located on the top side of the second main region in the second direction; a first folding unit that makes a valley fold along a first boundary line between the first main region and the first sub-region so that the first main region and the first sub-region overlap; a first cutting unit that cuts the top-side sheet material, the second sub-region, the first main region, and the second main region along a first cutting line extending from a portion where the top-side sheet material and the second sub-region overlap to a portion closer toward a bottom side in the second direction beyond the first boundary line; a second folding unit that makes a valley fold along a second boundary line between the second main region and the second sub-region so that the second main region and the second sub-region overlap; and a second cutting unit that cuts the top-side sheet material, the first sub-region, the first main region, and the second main region along a second cutting line to form a top-side sheet from the top-side sheet material, the second cutting line extending from a portion where the top-side sheet material and the first sub-region overlap to a portion closer toward the bottom side in the second direction beyond the second boundary line so as to intersect a first outline that is formed by the first cutting unit.

In a preferred embodiment of the present invention, the device is configured to cut the first main region and the second main region along a pair of third cutting lines to form a first body sheet from the first body sheet material and a second body sheet from the second body sheet material, and each of the pair of third cutting lines extend to a second outline that is formed by the second cutting unit and also to a bottom edge of each of the first main region and the second main region in the second direction.

Advantages of the Invention

The present invention can increase the design flexibility of the shape of the top-side sheet.

Other features and advantages of the present invention will become apparent from the detailed description given below with reference to the accompanying drawings.

MODE FOR CARRYING OUT THE INVENTION

Figure 1:
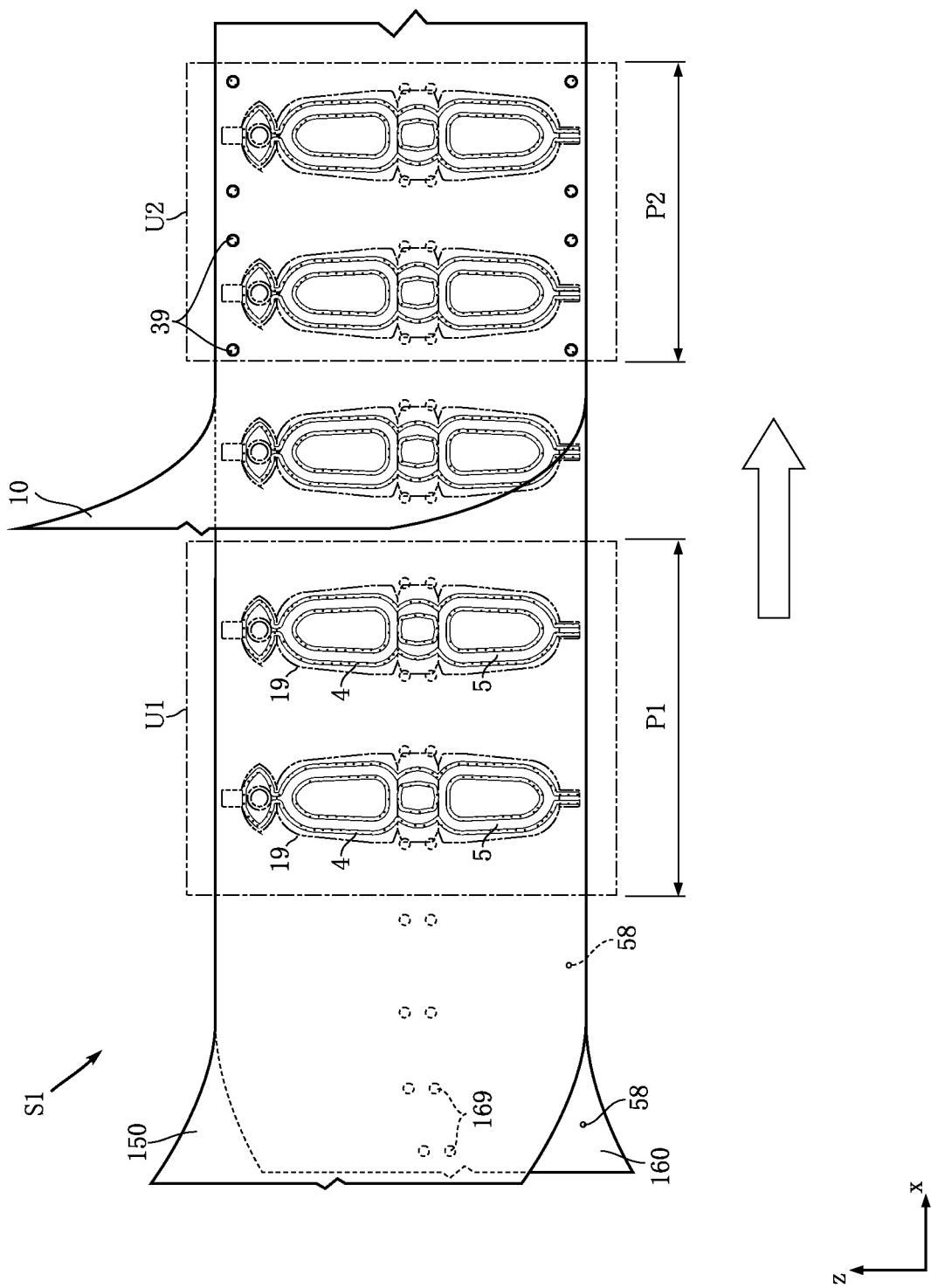
FIG. 1 is a fragmentary perspective view illustrating a pouch-type packaging material manufacturing method and a pouch-type packaging material manufacturing device according to a first embodiment of the present invention.

Preferred embodiments of the present invention are described below with reference to the drawings.

The ordinal terms, such as "first", "second" and "third" are used herein merely as labels and are not intended to impose ordinal requirements on the items to which these terms refer.

FIGS. 1, 3, 6, 12 and 17 illustrate a method and a device for manufacturing a pouch-type packaging material according to a first embodiment of the present invention. According to the present embodiment, the pouch-type packaging material manufacturing method includes a structural seal forming process P1, an auxiliary seal forming process P2, a spout hole forming process P3, a fold line forming process P4, a first preliminary folding process P5, a spout attaching process P6, a second preliminary folding process P7, a sheet joining process P8, a first folding process P9, a first point-seal forming process P10, a first cutting process P11, a second folding process P12, a second point-seal process P13, a second cutting process P14, and a third cutting process P15. The pouch-type packaging material manufacturing device S1 according to the present embodiment includes a structural seal forming unit U1, an auxiliary seal forming unit U2, a spout hole forming unit U3, a fold line forming unit U4, a first preliminary folding unit U5, a spout attaching unit U6, a second preliminary folding unit U7, a sheet joining unit U8, a first folding unit U9, a first point-seal forming unit U10, a first cutting unit U11, a second folding unit U12, a second point-seal unit U13, a second cutting unit U14, and a third cutting unit U15. The pouch-type packaging material manufacturing method and the pouch-type packaging material manufacturing device S1 of the present embodiment are designed to manufacture a plurality of pieces of pouch-type packaging material A1 in succession. In the present embodiment, the series of units from the structural seal forming unit U1 to the third cutting unit U15 are described to perform the relevant processes on a raw material sheet 10, a first structural sheet material 150, and a second structural sheet material 160 each of which is a continuous length of sheet (described later). In a different embodiment, each of the raw material sheet 10, the first structural sheet material 150, and the second structural sheet material 160 may be separate sheets cut to an appropriate length before the series of processes. Although not shown in the figures, any conventionally known conveyor mechanism for forwarding a continuous length of sheet can be used for forwarding the raw material sheet 10, the first structural sheet material 150, and the second structural sheet material 160 in the x direction. For example, the present embodiment assumes a mechanism that pulls the raw material sheet 10, the first structural sheet material 150, and the second structural sheet material 160 in the x direction by cramping the positions between adjacent pieces of pouch-type packaging material A1 to be formed. In addition, the present embodiment includes a conveyor unit U21 for conveying the raw material sheet 10, the first structural sheet material 150, and the second structural sheet material 160 for the processes at the second cutting unit U14 and the third cutting unit U15.

The pouch-type packaging material manufacturing method and the pouch-type packaging material manufacturing device according to present invention are not limited to specific configurations. For example, the structural seal forming process P1 and the auxiliary seal forming process P2 may be completed in advance separately from other processes. In this case, the structural seal forming unit U1 and the auxiliary seal forming unit U2 may be omitted. In addition, the spout hole forming process P3, the fold line forming process P4, the first preliminary folding process P5, the spout attaching process P6, the second preliminary folding process P7, and the sheet joining process P8 may be completed in advance separately from other processes. In this case, the spout hole forming unit U3, the fold line forming unit U4, the first preliminary folding unit U5, the spout attaching unit U6, the second preliminary folding unit U7, and the sheet joining unit U8 may be omitted.

As will be described later with reference to FIGS. 30 to 33, a pouch-type packaging material A1 manufactured by the pouch-type packaging material manufacturing method and the pouch-type packaging material manufacturing device of the present embodiment includes a first body sheet 11, a second body sheet 12, a top-side sheet 13, and a bottom gusset sheet 14, and also includes a first structural sheet 15 and a second structural sheet 16. In another example, however, the first structural sheet 15 and the second structural sheet 16 may be omitted. In a yet another example, the bottom gusset sheet 14 may be omitted.

In the figures described below, the y direction corresponds to the first direction of the present invention, the z direction to the second direction, and the x direction to the third direction. The z direction may correspond to the vertical direction in some situations. The x direction is the feed direction in which the sheet materials are forwarded by the pouch-type packaging material manufacturing method and the pouch-type packaging material manufacturing device S1. Note, however, that the z direction in FIGS. 1 to 3 does not necessarily correspond to the second direction of the present invention, at least during the stages before the first preliminary folding process P5 is completed by the first preliminary folding unit U5.

<Structural Seal Forming Process P1 and Structural Seal Forming Unit U1>

As shown in FIG. 1, a first structural sheet material 150 and a second structural sheet material 160 are prepared. The first structural sheet material 150 and the second structural sheet material 160 are long strips of synthetic resin in the x direction and can be formed into a plurality of first structural sheets 15 and a plurality of second structural sheets 16 for a plurality of pieces of pouch-type packaging material A1. For convenience, the figure shows a package outline 19 representing an imaginary outline of the pieces of pouch-type packaging material A1.

The manufacturing method described below assumes that the first structural sheet material 150 has a sealant film layer on both surfaces, and that the second structural sheet material 160 has a sealant film layer on the inner surface (the one facing toward the first structural sheet material 150) and a substrate film layer on the outer surface (the one facing away from the first structural sheet material 150). The first structural sheet material 150 may be composed of a substrate film layer sandwiched between two sealant film layers or a coextruded film of two heat-seal layers and a polyamide film or the like as a middle layer. When high barrier properties and light-shielding properties are desirable, the first structural sheet material 150 and the second structural sheet material 160 may additionally include a barrier layer, a barrier resin, a deposition layer and a color layer.

Some examples of the materials for the substrate film layer, the sealant film layer, and the barrier layer are listed below. These layers can be laminated using a common lamination technique, such as coextrusion lamination, dry lamination using an adhesive, or thermal lamination in which layers are thermally bonded via a heat-sensitive adhesive layer sandwiched therebetween.

Examples of films that can be used to form the substrate film layer include single- or multi-layer films made from polyester (such as polyethylene terephthalate (PET), polyethylene naphthalate (PEN), polybutylene terephthalate (PBT), and polycarbonate (PC)), polyolefin (such as polyethylene (PE) and polypropylene (PP)), polyamide (such as Nylon-6 and Nylon-66). Each film may be either oriented or non-oriented but preferably biaxially oriented.

Examples of films that can be used to form the sealant layer include single- or multi-layer films made from low-density polyethylene (LDPE), linear low-density polyethylene (LLDPE), ethylene-propylene copolymer (EP), cast polypropylene (CPP), ethylene-olefin copolymer, ethylene acrylic acid (EAA) copolymer, ethylene-methyl methacrylate (EMMA) copolymer, and ethylene-vinyl acetate (EVA) copolymer.

For instance, the barrier layer may be provided by: a foil of a metal such as aluminum; a film or synthetic resin made of polyvinylidene chloride (PVDC) or ethylene vinyl alcohol (EVOH) copolymer; and a film provided by depositing (or sputtering) aluminum or inorganic oxide, such as aluminum oxide or silica, on any suitable synthetic resin layer (which may be a substrate film layer).

The second structural sheet material 160 is formed with a plurality of sealing through-holes 169 and a plurality of fill openings 58. Each sealing through-hole 169 is used to join portions the first structural sheet material 150 in the sheet joining process P8, which will be described later. Each fill opening 58 is used to inject a filler 59 into a filler-enclosing portion 5, which will be described later. The structural seal forming process P1 is performed at the structural seal forming unit U1 after the first structural sheet material 150 and the second structural sheet material 160 are overlaid on each other. In the structural seal forming process P1, portions of the first structural sheet material 150 and the second structural sheet material 160 are joined together by heat sealing.

Figure 2:
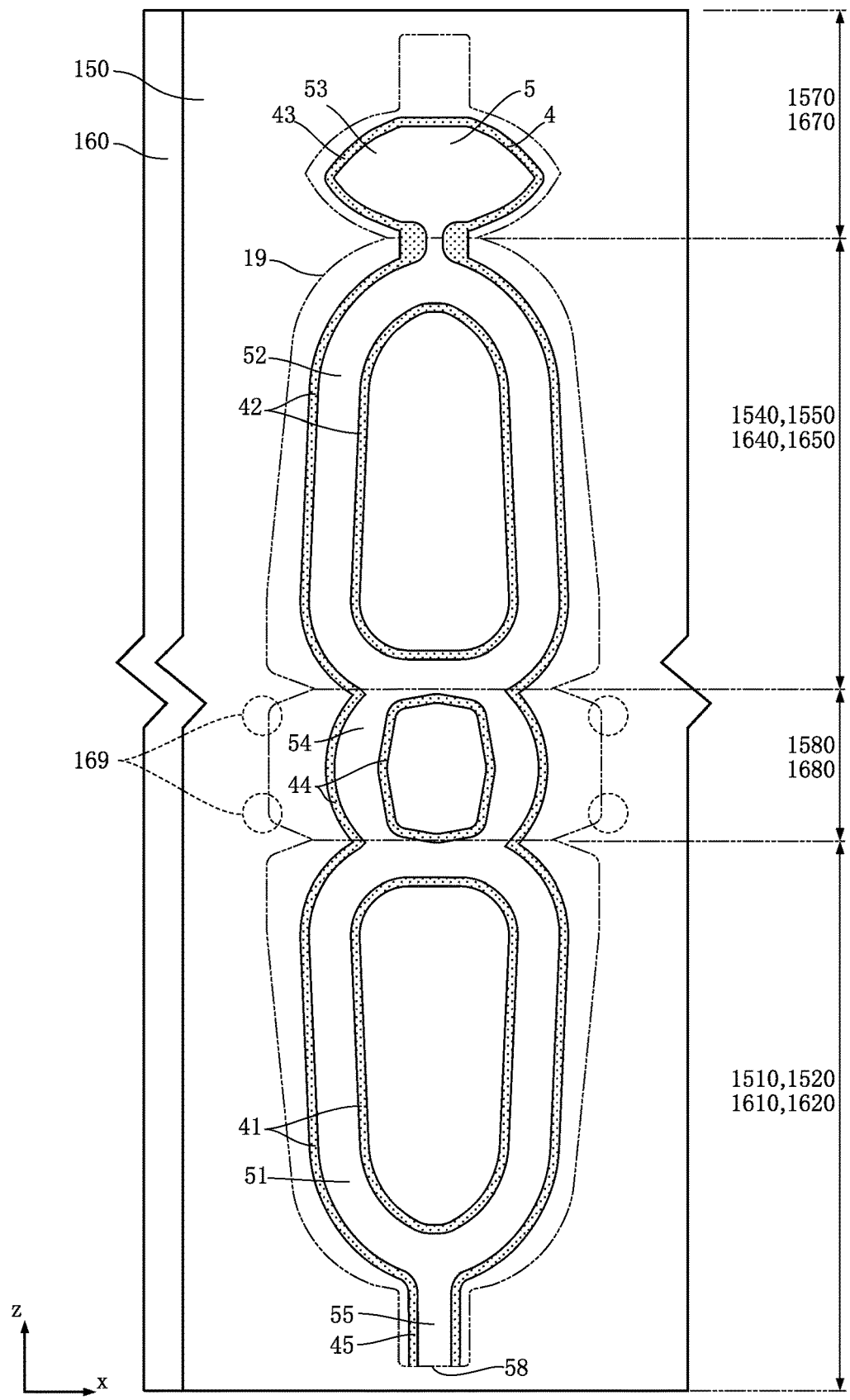
FIG. 2 is a fragmentary front view illustrating a structural seal forming process of the pouch-type packaging material manufacturing method according to the first embodiment of the present invention.

FIG. 2 is a plan view showing a portion of the first structural sheet material 150 and the second structural sheet material 160 in the x direction. The illustrated portion of the first structural sheet material 150, and the second structural sheet material 160 is of a length enough for fabricating one piece of pouch-type packaging material A1. As shown in FIG. 2, the first structural sheet material 150 will be folded in the processes described later. When folded, the first structural sheet material 150 is divided into a first main region 1510, a first sub-region 1520, a second main region 1540, a second sub-region 1550, a top-side region 1570, and a bottom-side region 1580. Similarly, the second structural sheet material 160 will be divided into a first main region 1610, a first sub-region 1620, a second main region 1640, a second sub-region 1650, atop-side region 1670, and a bottom-side region 1680. In the structural seal forming process P1, portions of the first structural sheet material 150 are heat sealed to portions of the second structural sheet material 160 to form a structural seal 4 and a filler-enclosing portion 5.

In the illustrated example, the structural seal 4 includes a first structural seal 41, a second structural seal 42, a top-side structural seal 43, a bottom-side structural seal 44, and an extension structural seal 45. The first structural seal 41 is formed by heat sealing a portion in the first main region 1510 and the first sub-region 1520 of the first structural sheet material 150 to a portion in the first main region 1610 and the first sub-region 1620 of the second structural sheet material 160. In the illustrated example, the first structural seal 41 defines two substantially looped shapes, one around the other. The second structural seal 42 is formed by heat sealing a portion in the second main region 1540 and the second sub-region 1550 of the first structural sheet material 150 to a portion in the second main region 1640 and the second sub-region 1650 of the second structural sheet material 160. In the illustrated example, the second structural seal 42 defines two substantially looped shapes, one around the other.

The top-side structural seal 43 is formed by heat sealing a portion in the top-side region 1570 of the first structural sheet material 150 to a portion in the top-side region 1670 of the second structural sheet material 160. In the illustrated example, the top-side structural seal 43 defines a substantially looped shape. The bottom-side structural seal 44 is formed by heat sealing a portion in the bottom-side region 1580 of the first structural sheet material 150 to a portion in the bottom-side region 1680 of the second structural sheet material 160. In the illustrated example, the bottom-side structural seal 44 defines a substantially looped shape. The extension structural seal 45 is formed by heat sealing a portion in the first sub-region 1520 of the first structural sheet material 150 to a portion in the first sub-region 1620 of the second structural sheet material 160. In the illustrated example, the extension structural seal 45 defines the shape of a pair of strips extending in the z direction.

The filler-enclosing portion 5 will be filled with the filler 59 as described later, for helping a pouch container formed from the pouch-type packaging material A1 to keep its outer shape and to stand erect. In the illustrated example, the filler-enclosing portion 5 includes a first filler-enclosing portion 51, a second filler-enclosing portion 52, a top-side filler-enclosing portion 53, a bottom-side filler-enclosing portion 54, and an extension filler-enclosing portion 55.

The first filler-enclosing portion 51 is a space between the first structural sheet material 150 and the second structural sheet material 160 enclosed by the first structural seal 41 and includes an area of the first main region 1510 and the first sub-region 1520 and an area of the first main region 1610 and the first sub-region 1620. The second filler-enclosing portion 52 is a space between the first structural sheet material 150 and the second structural sheet material 160 enclosed by the second structural seal 42 and includes an area of the second main region 1540 and the second sub-region 1550 and an area of the second main region 1640 and the second sub-region 1650.

The top-side filler-enclosing portion 53 is a space between the top-side region 1570 of the first structural sheet material 150 and the top-side region 1670 of the second structural sheet material 160 enclosed by the top-side structural seal 43. The bottom-side filler-enclosing portion 54 is a space between the bottom-side region 1580 of the first structural sheet material 150 and the bottom-side region 1680 of the second structural sheet material 160 and enclosed by the bottom-side structural seal 44. The extension filler-enclosing portion 55 is a space between the first sub-region 1520 of the first structural sheet material 150 and the first sub-region 1620 of the second structural sheet material 160 enclosed by the extension structural seal 45. The extension filler-enclosing portion 55 connects to the fill opening 58. In the present embodiment, the fill opening 58 is open in the z-direction edges of the first sub-region 152 and the first sub-region 162.

The structural seal forming unit U1 is a component that operates to form the structural seal 4 in the first structural sheet material 150 and the second structural sheet material 160. The specific structure of the structural seal forming unit U1 is not limited and may include conventionally known components, such as a heat sealing die provided with a built-in heater, and a cooling unit for cooling a portion that is heat sealed by the sealing die.

<Auxiliary Seal Forming Process P2 and Auxiliary Seal Forming Unit U2>

After the structural seal forming process P1, the raw material sheet 10 is overlaid in face-to-face relation with the first structural sheet material 150 as shown in FIG. 1. The raw material sheet 10 is a continuous sheet that forms a first body sheet material 110, a second body sheet material 120, a top-side sheet material 130, and a bottom-side sheet material 140, each of which will be described later. That is, in the present embodiment, the first body sheet material 110, the second body sheet material 120, the top-side sheet material 130, and the bottom-side sheet material 140 are portions of one raw material sheet 10. In a different embodiment, any or all of the first body sheet material 110, the second body sheet material 120, the top-side sheet material 130, and the bottom-side sheet material 140 may be separate sheets.

Next, the auxiliary seal forming process P2 is performed at the auxiliary seal forming unit U2. The auxiliary seal forming process P2 forms a plurality of auxiliary seals 39 in the raw material sheet 10, the first structural sheet material 150, and the second structural sheet material 160. The auxiliary seals 39 are provided to temporarily join the raw material sheet 10, the first structural sheet material 150, and the second structural sheet material 160. According to this method, the raw material sheet 10 includes a pair of sealant film layers as outermost layers, and one or more layers, such as a substrate film layer and/or a barrier layer, sandwiched between the sealant film layers as desired.

The auxiliary seal forming unit U2 is a component that operates to form the auxiliary seals 39 in the raw material sheet 10, the first structural sheet material 150, and the second structural sheet material 160. The specific structure of the auxiliary seal forming unit U2 is not limited and may include conventionally known components, such as a heat sealing die provided with a built-in heater, and a cooling unit for cooling a portion that is heat sealed by the sealing die.

<Spout Hole Forming Process P3 and Spout Hole Forming Unit U3>

Figure 3:
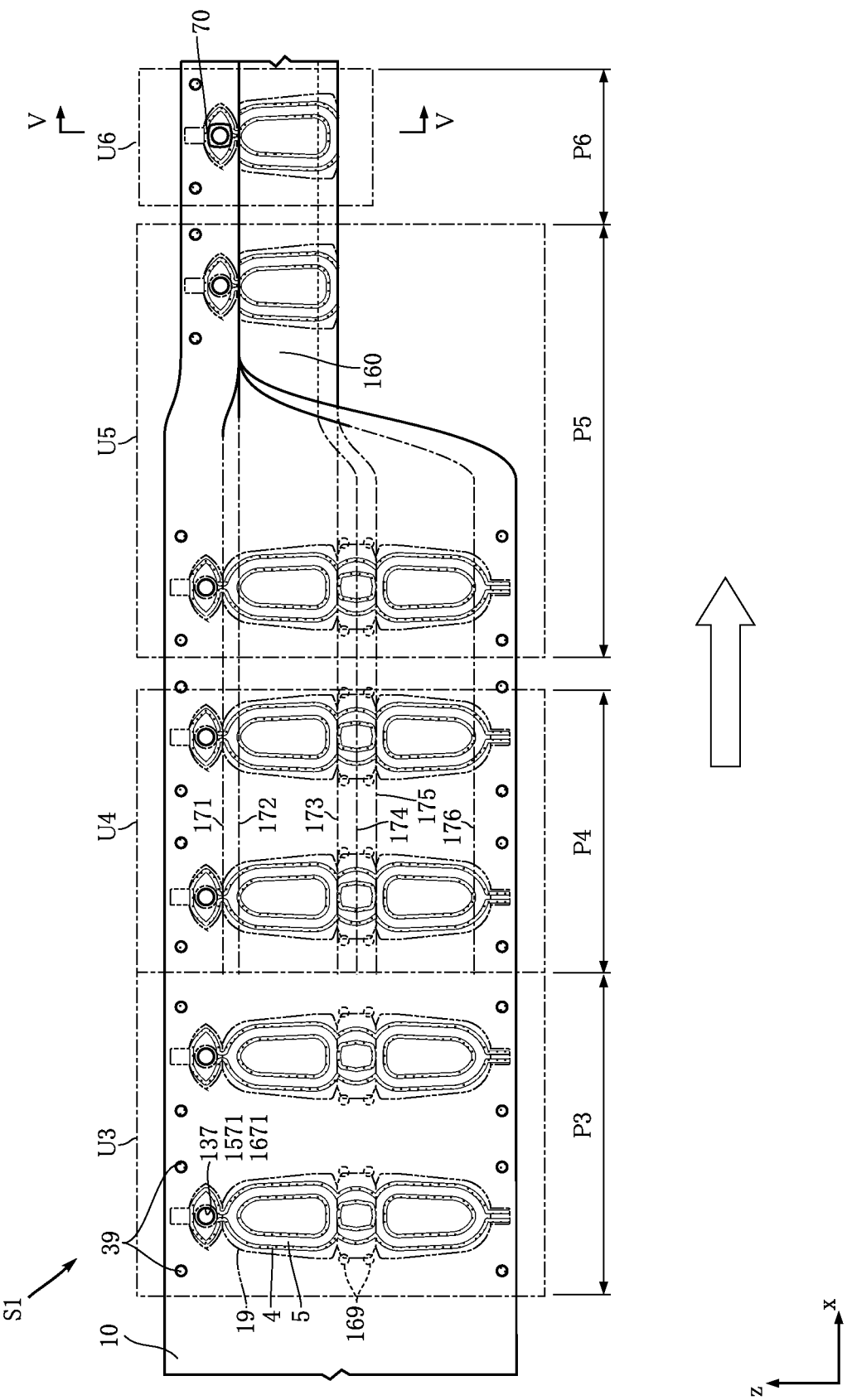
FIG. 3 is a fragmentary front view illustrating the pouch-type packaging material manufacturing method and the pouch-type packaging material manufacturing device according to the first embodiment of the present invention.
Figure 4:
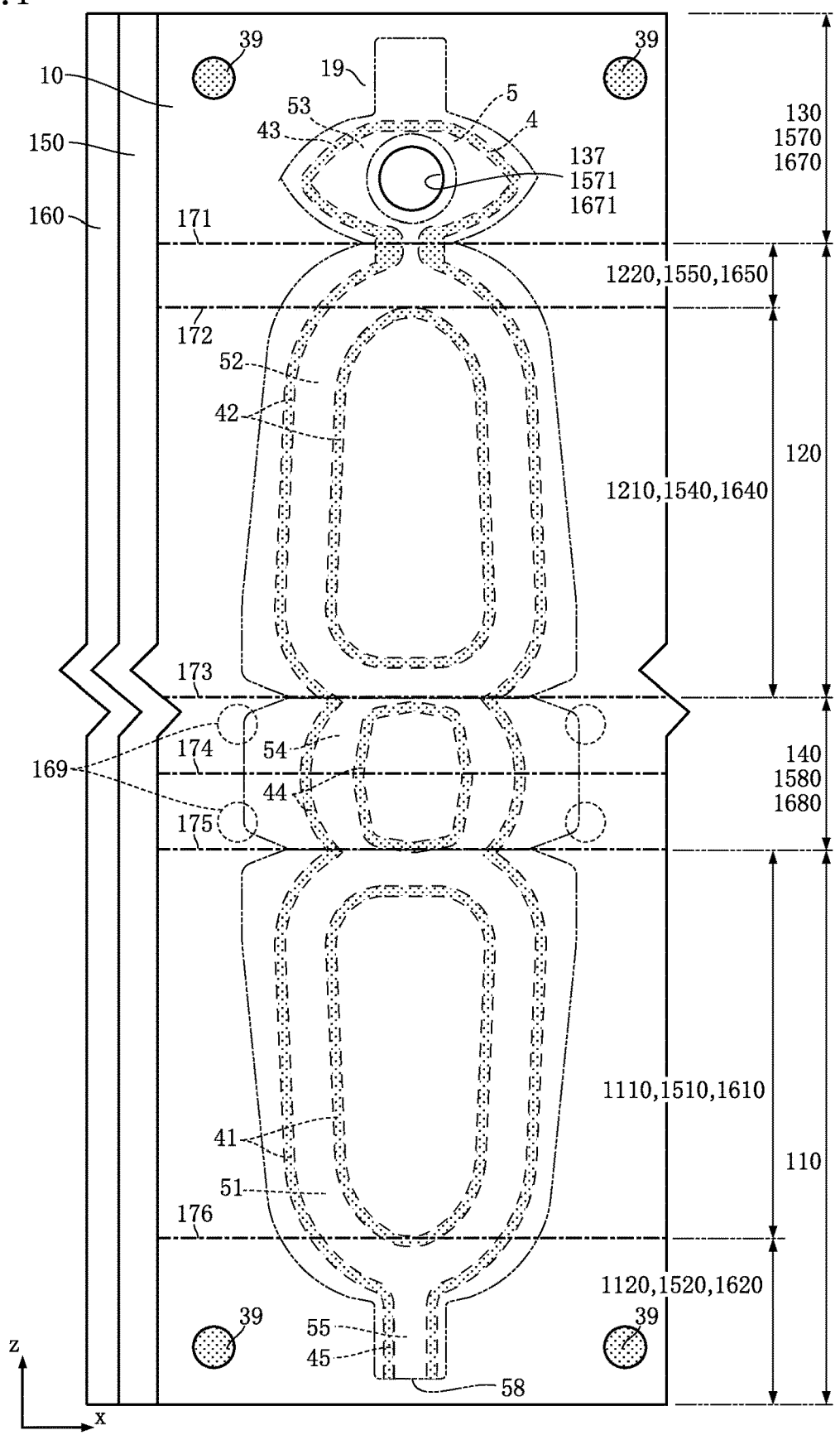
FIG. 4 is a fragmentary front view illustrating an auxiliary seal forming process and a spout hole forming process of the pouch-type packaging material manufacturing method according to the first embodiment of the present invention.

After the auxiliary seal forming process P2 is completed at the auxiliary seal forming unit U2, the spout hole forming process P3 is performed at the spout hole forming unit U3 as shown in FIG. 3. In the spout hole forming process P3, spout holes 137, 1571 and 1671 are formed in the raw material sheet 10, the first structural sheet material 150, and the second structural sheet material 160 as shown in FIG. 4. FIG. 4 is a plan view showing a portion of the raw material sheet 10, the first structural sheet material 150, and the second structural sheet material 160 in the x direction. The illustrated portion of the raw material sheet 10, the first structural sheet material 150, and the second structural sheet material 160 is of a length enough for fabricating one piece of pouch-type packaging material A1. The spout holes 137, 1571 and 1671 penetrate the raw material sheet 10, the first structural sheet material 150, and the second structural sheet material 160 in an area of the top-side sheet material 130 and the top-side regions 1570 and 1670 that is enclosed by the top-side structural seal 43. In the illustrated example, the spout holes 137, 1571 and 1671 overlap with each other.

The spout hole forming unit U3 is a component that operates to form the spout holes 137, 1571 and 1671 in the raw material sheet 10, the first structural sheet material 150, and the second structural sheet material 160. The specific structure of the spout hole forming unit U3 is not limited and may include conventionally known cutting tools, such as cutting blades, cutting dies, and lasers. For durability, the configuration using a punch and a die is preferable.

<Fold Line Forming Process P4 and Fold Line Forming Unit U4>

As shown in FIG. 3, the fold line forming process P4 is performed at the fold line forming unit U4. In the fold line forming process P4, as shown in FIG. 4, fold lines 171, 172, 173, 174, 175 and 176 are formed in the raw material sheet 10, the first structural sheet material 150, and the second structural sheet material 160. The fold lines 171, 172, 173, 174, 175 and 176 are provided for allowing the raw material sheet 10, the first structural sheet material 150, and the second structural sheet material 160 to be folded easily and reliably in a subsequent process. The fold line forming process P4 can be omitted partly or entirely, and the method may proceed to a subsequent process.

The fold line 171 is provided at a position dividing the top-side sheet material 130 and the top-side regions 1570 and 1670 from the second sub-regions 1220, 1550 and 1650. The fold line 172 is provided at a position dividing the second sub-regions 1220, 1550 and 1650 from the second main regions 1210, 1540 and 1640. The fold line 173 provided at a position dividing the second main regions 1210, 1540 and 1640 from the bottom-side sheet material 140 and the bottom-side regions 1580 and 1680. The fold line 175 is provided at a position dividing the bottom-side sheet material 140 and the bottom-side regions 1580 and 1680 from the first main regions 1110, 1510 and 1610. The fold line 174 is made between the fold lines 173 and 175. The fold line 176 is provided at a position dividing the first main regions 1110, 1510 and 1610 from the first sub-regions 1120, 1520 and 1620.

The fold line forming unit U4 is a component that operates to form the fold lines 171, 172, 173, 174, 175 and 176 in the raw material sheet 10, the first structural sheet material 150, and the second structural sheet material 160. The specific structure of the fold line forming unit U4 is not limited, and any known mechanism for providing creases locally in a sheet material can be used.

<First Preliminary Folding Process P5 and First Preliminary Folding Unit U5>

Next, the first preliminary folding process P5 is performed at the first preliminary folding unit U5. In the first preliminary folding process P5, the raw material sheet 10, the first structural sheet material 150, and the second structural sheet material 160 are valley folded along the fold line 171 to form a trench with the raw material sheet 10 facing inside. Additionally, the raw material sheet 10, the first structural sheet material 150, and the second structural sheet material 160 are mountain folded along the fold line 172 to form a ridge with the raw material sheet 10 facing outside. Additionally, the raw material sheet 10, the first structural sheet material 150, and the second structural sheet material 160 are valley folded along each of the fold lines 173 and 175 to form a trench with the raw material sheet 10 facing inside, and mountain folded along the fold line 174 to form a ridge with the raw material sheet 10 facing outside. Additionally, the raw material sheet 10, the first structural sheet material 150, and the second structural sheet material 160 are mountain folded along the fold line 176 to form a ridge with the raw material sheet 10 facing outside.

The first preliminary folding unit U5 is a component that operates to perform the first preliminary folding process P5. The specific structure of the first preliminary folding unit U5 is not limited, and any known sheet-folding mechanism can be used.

Figure 5:
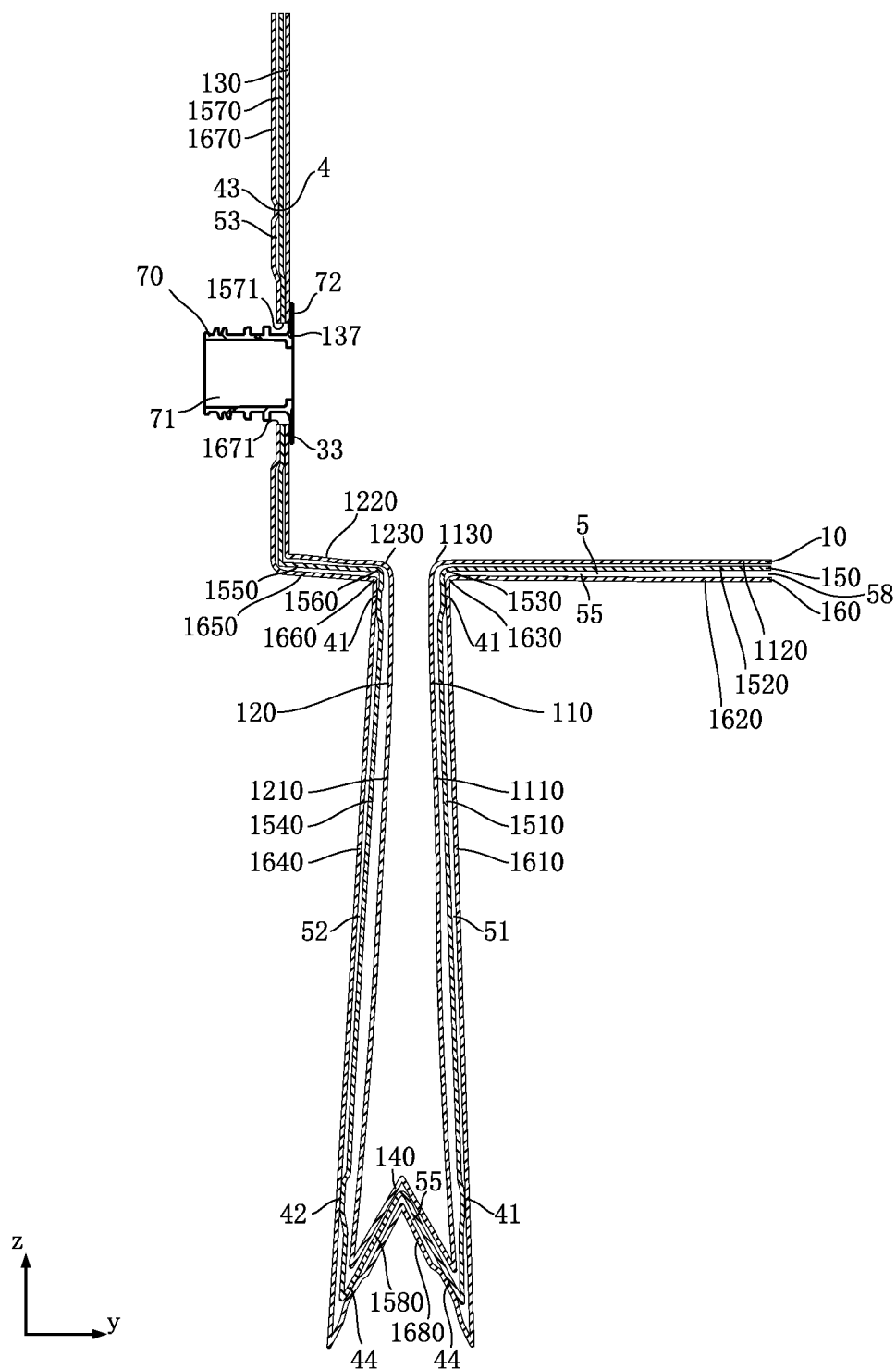
FIG. 5 is a sectional view taken along line V-V of FIG. 3.

As shown in FIG. 5, the fold along the fold line 171 defines the top-side sheet material 130 and the top-side regions 1570 and 1670 respectively in the raw material sheet 10, the first structural sheet material 150, and the second structural sheet material 160. The fold along the fold line 172 defines the second body sheet material 120, the second main region 1540, the second sub-region 1550, the second main region 1640, and the second sub-region 1650 in the raw material sheet 10, the first structural sheet material 150, and the second structural sheet material 160. The fold along each of the fold lines 173 and 175 defines the bottom-side sheet material 140 and the bottom-side regions 1580 and 1680 and also defines the first body sheet material 110. The fold along the fold line 176 defines the first main region 1110, the first sub-region 1120, the first main region 1510, the first sub-region 1520, the first main region 1610, and the first sub-region 1620. For the purpose of clarity, FIG. 5 shows each sheet thickness significantly greater than the actual thickness. Thus, the bending and/or overlapping state of the sheets shown in the figure may not precisely reflect the actual state. The same holds with respect to the sectional views referenced below.

In addition, the fold along the fold line 172 forms the second boundary lines 1230, 1560 and 1660 in the raw material sheet 10, the first structural sheet material 150, and the second structural sheet material 160. The second boundary lines 1230, 1560 and 1660 divide the second main regions 1210, 1540 and 1640 from the second sub-region 1220, 1550 and 1650. The fold along the fold line 176 forms the first boundary lines 1130, 1530 and 1630 in the raw material sheet 10, the first structural sheet material 150, and the second structural sheet material 160. The first boundary lines 1130, 1530 and 1630 divide the first main region 1110, 1510 and 1610 from the first sub-region 1120, 1520 or 1620.

<Spout Attaching Process P6 and Spout Attaching Unit U6>

Next, the spout attaching process P6 is performed at the spout attaching unit U6. In the spout attaching process P6, a mouth 71 of a spout 7 is inserted into the spout holes 137, 1571 and 1671 as shown in FIG. 5. Then, a spout seal 33 is formed by heat sealing a flange 72 of the spout 7 to the top-side sheet material 130 and the top-side regions 1570 and 1670. The flange 72 may be a molded article of a heat sealable resin, such as polyethylene or polypropylene.

The spout attaching unit U6 is a component that operates to attach the spout 7 in the spout attaching process P6. The specific structure of the spout attaching unit U6 is not limited and may include conventional components, such as a conveyor mechanism for inserting the spout 7, a heat sealing die provided with a built-in heater, and a cooling unit for cooling a portion that is heat sealed by the sealing die.

<Second Preliminary Folding Process P7 and Second Preliminary Folding Unit U7>

Figure 6:
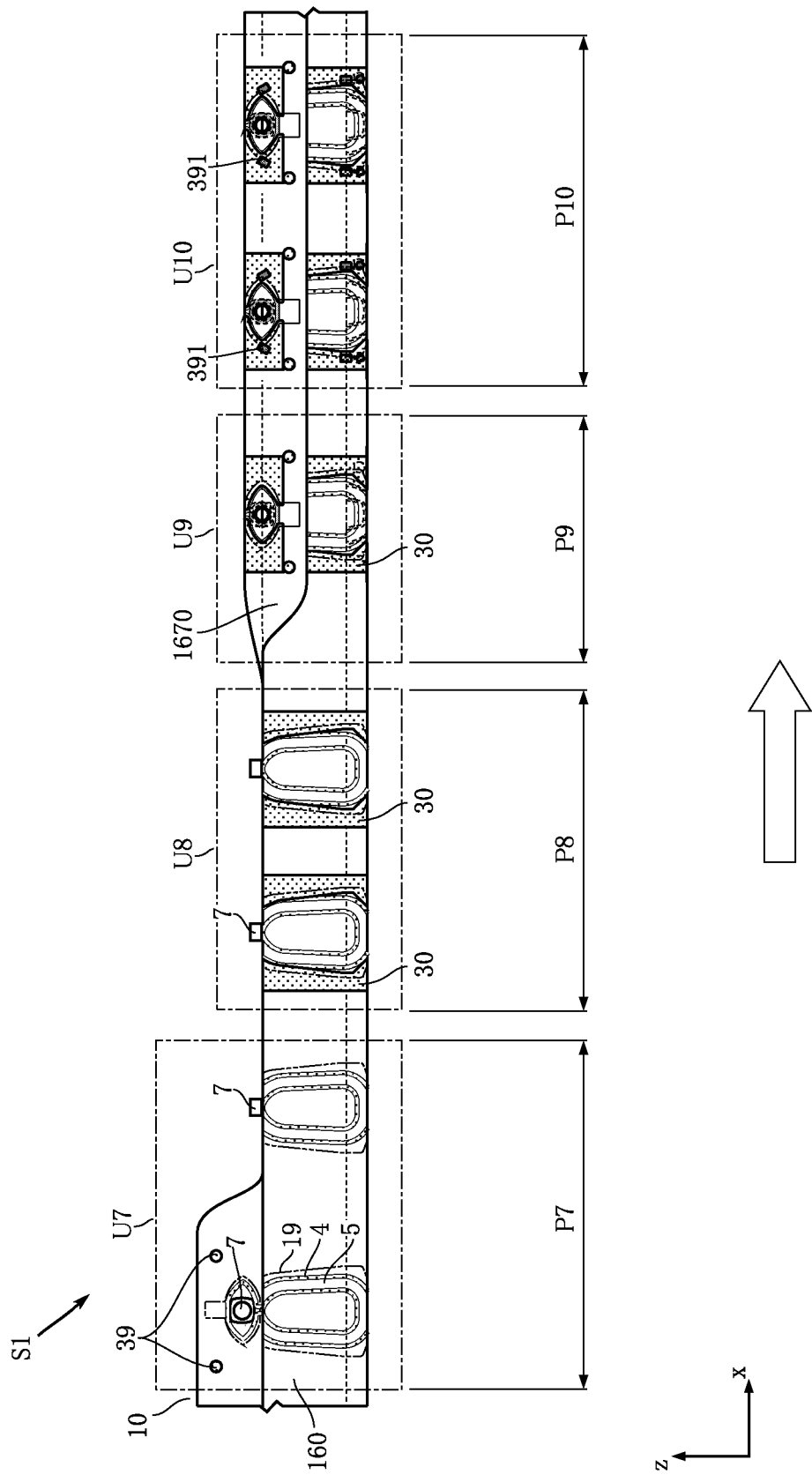
FIG. 6 is a fragmentary front view illustrating the pouch-type packaging material manufacturing method and the pouch-type packaging material manufacturing device according to the first embodiment of the present invention.

Next, the second preliminary folding process P7 is performed at the second preliminary folding unit U7 as shown in FIG. 6. In the second preliminary folding process P7, the raw material sheet 10, the first structural sheet material 150, and the second structural sheet material 160 are folded along the fold line 171, until the top-side sheet material 130 and the top-side regions 1570 and 1670 are held along the x and y directions. In this state, the top-side sheet material 130 and the top-side regions 1570 and 1670 are held along the x and y directions, as well as the first sub-regions 1120, 1520 and 1620 and the second sub-regions 1220, 1550 and 1650.

The second preliminary folding unit U7 is a component that operates to perform the folding in the spout attaching process P6. The specific structure of the second preliminary folding unit U7 is not limited, and any known sheet-folding mechanism can be used.

<Sheet Joining Process P8 and Sheet Joining Unit U8>

Figure 7:
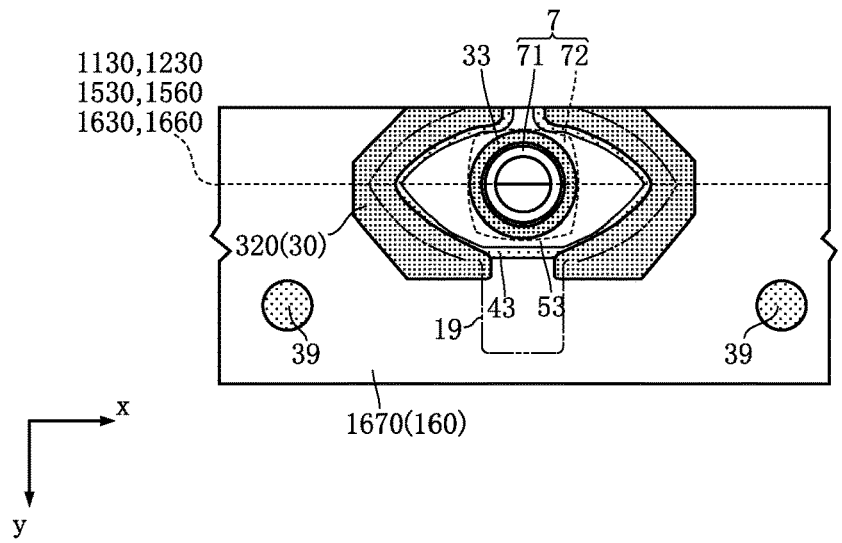
FIG. 7 is a fragmentary plan view illustrating a sheet joining process of the pouch-type packaging material manufacturing method according to the first embodiment of the present invention.
Figure 8:
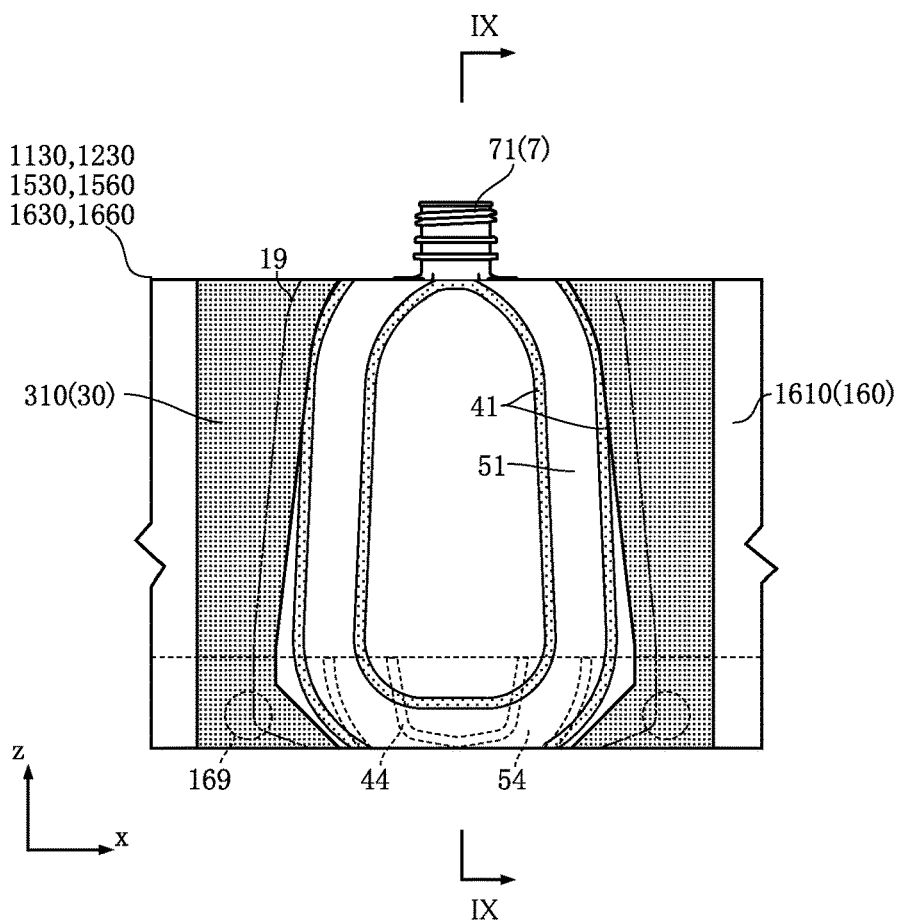
FIG. 8 is a fragmentary front view illustrating the sheet joining process of the pouch-type packaging material manufacturing method according to the first embodiment of the present invention.
Figure 9:
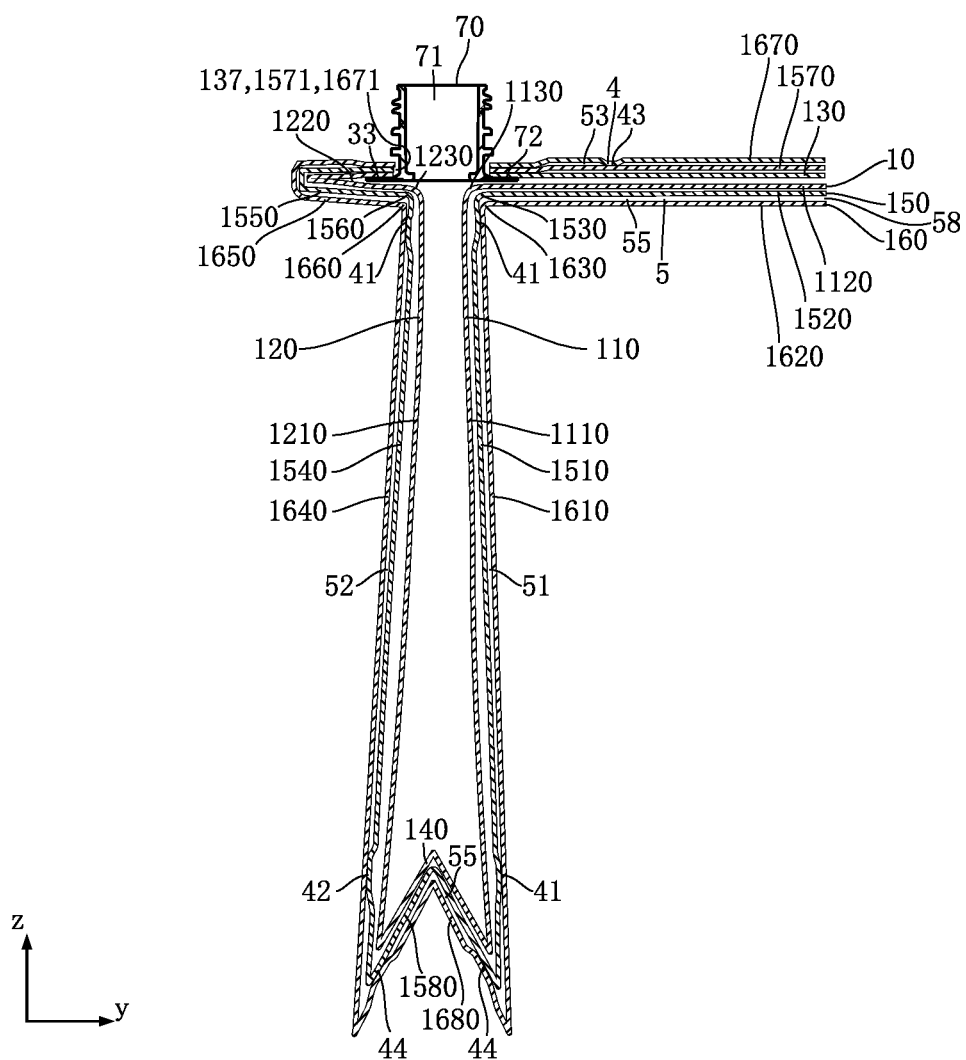
FIG. 9 is a sectional view taken along line IX-IX of FIG. 8.

Next, the sheet joining process P8 is performed at the sheet joining unit U8. In the sheet joining process P8, portions of the raw material sheet 10, the first structural sheet material 150, and the second structural sheet material 160 are joined together to form a seal 30 as shown in FIGS. 7, 8 and 9. Each of FIGS. 7 and 8 is a plan view showing a portion of the raw material sheet 10, the first structural sheet material 150, and the second structural sheet material 160 in the x direction. The illustrated portion of the raw material sheet 10, the first structural sheet material 150, and the second structural sheet material 160 is of a length enough for fabricating one piece of pouch-type packaging material A1.

The seal 30 joins appropriate portions of the first body sheet material 110, the second body sheet material 120, the top-side sheet material 130, the bottom-side sheet material 140, the first structural sheet material 150, and the second structural sheet material 160. In this embodiment, the seal 30 is formed by heat sealing. The seal 30 includes a pair of side seals 310 and a top-side seal 320.

The pair of side seals 310 join the opposite edges in the x direction of the first body sheet material 110, the second body sheet material 120, the bottom-side sheet material 140, the first structural sheet material 150 and the second structural sheet material 160. In the illustrated example, each side seal 310 overlaps with an outer portion of the first structural seal 41 in the x direction. Each side seal 310 also overlaps with a sealing through-hole 169. Since the bottom-side region 1680 is absent in each sealing through-hole 169, portions of the bottom-side region 1580 exposed through the sealing through-hole 169 are joined together by heat sealing. The bottom-side region 1680 is not sealed together except at the sealing through-holes 169 and therefore serves as a gusset.

The top-side seal 320 joins portions of the top-side sheet material 130 and the top-side regions 1570 and 1670 to portions of the first sub-regions 1120, 1520 and 1620 and portions of the second sub-regions 1220, 1550 and 1650. In the illustrated example, the top-side seal 320 overlaps with an outer portion of the top-side structural seal 43.

The sheet joining unit U8 is a component that operates to perform the heat sealing in the sheet joining process P8. The specific structure of the sheet joining unit U8 is not limited and may include conventionally known heat sealing components, such as a heat sealing die provided with a built-in heater, and a cooling unit for cooling a portion that is heat sealed by the sealing die.

<First Folding Process P9 and First Folding Unit U9>

Figure 11:
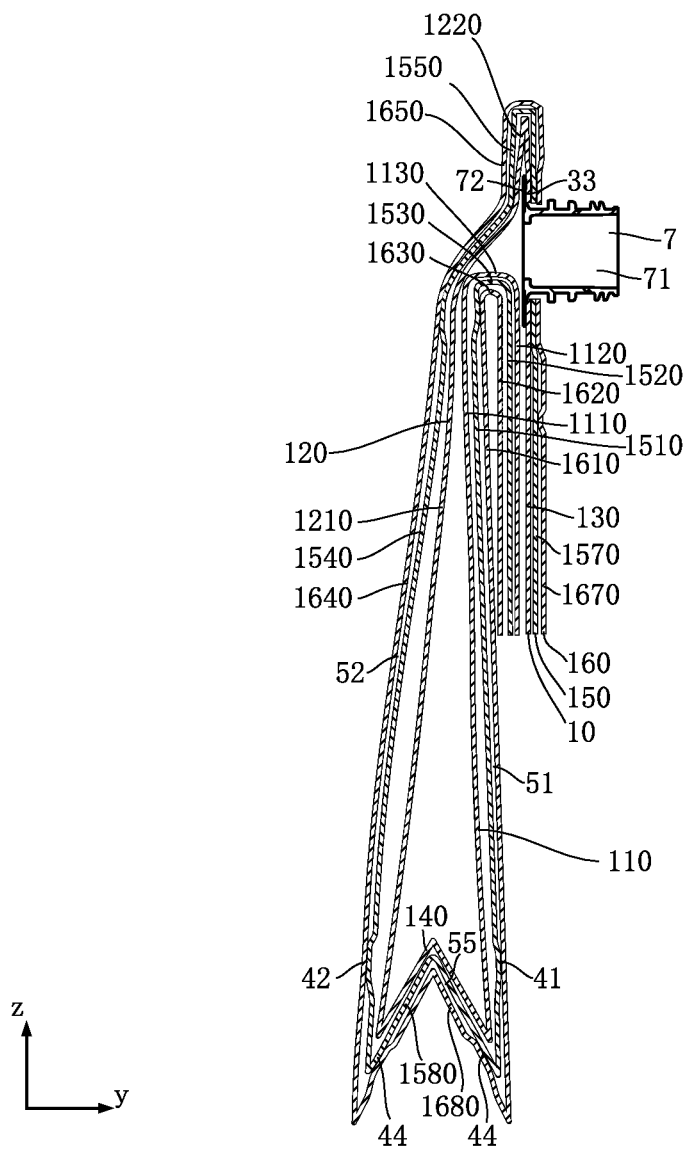
FIG. 11 is a sectional view taken along line XI-XI of FIG. 10.

Next, the first folding process P9 is performed at the first folding unit U9 as shown in FIG. 6. In the first folding process P9, the first body sheet material 110, the first structural sheet material 150, and the second structural sheet material 160 are folded along the first boundary lines 1130, 1530 and 1630 as shown in FIG. 9. As a result, the second body sheet material 120 is held along the z direction as shown in FIG. 11. In addition, the first sub-regions 1120, 1520 and 1620 are overlaid on the first main regions 1110, 1510 and 1610 along the z direction. In addition, the top-side sheet material 130 and the top-side regions 1570 and 1670 are held along the z direction on the opposite side of the first main regions 1110, 1510 and 1610 across the first sub-regions 1120, 1520 and 1620 in the y direction.

The first folding unit U9 is a component that operates to perform the folding in the first folding process P9. The specific structure of the first folding unit U9 is not limited, and any known sheet-folding mechanism can be used.

<First Point-Seal Forming Process P10 and First Point-Seal Forming Unit U10>

Figure 10:
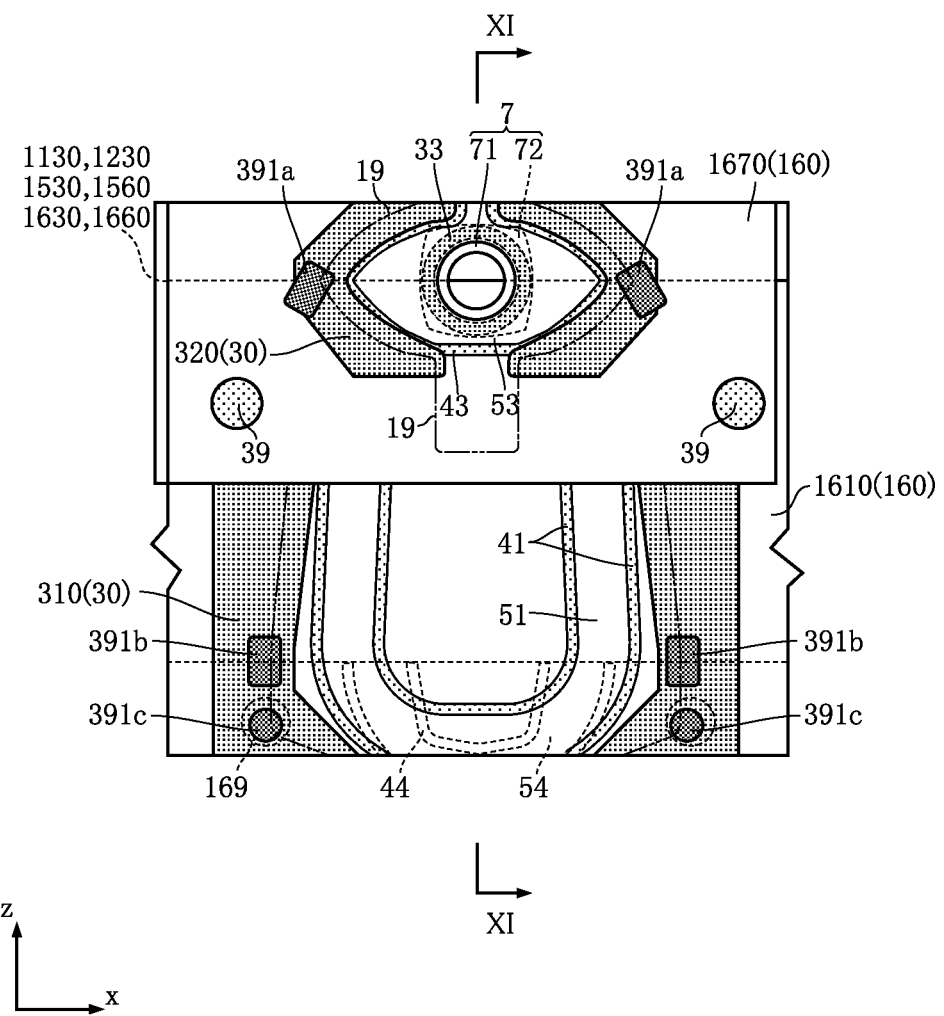
FIG. 10 is a fragmentary front view illustrating a first point-seal forming process of the pouch-type packaging material manufacturing method according to the first embodiment of the present invention.

Next, as shown in FIG. 6, the first point-seal forming process P10 is performed at the first point-seal forming unit U10. In the first point-seal forming process P10, a plurality of first reinforcement seals 391 are formed at appropriate locations in the raw material sheet 10, the first structural sheet material 150, and the second structural sheet material 160 after the first folding process P9. The first reinforcement seals 391 are formed to locally increase the seal strength of the seal 30. In the illustrated example, the plurality of first reinforcement seals 391 include first reinforcement seals 391a, 391b and 391c as shown in FIG. 10. FIG. 10 is a plan view showing a portion of the raw material sheet 10, the first structural sheet material 150, and the second structural sheet material 160 in the x direction. The illustrated portion of the raw material sheet 10, the first structural sheet material 150, and the second structural sheet material 160 is of a length enough for fabricating one piece of pouch-type packaging material A1.

The first reinforcement seals 391a are formed in areas where the outer edges of the package outline 19 in the x direction overlap with the first boundary line 1130, the second boundary line 1230, the first boundary line 1530, the second boundary line 1560, the first boundary line 1630 and the second boundary line 1660. The first reinforcement seals 391b are formed in areas where the outer edges of the package outline 19 in the x direction overlap with the mountain folded edges of the bottom-side sheet material 140 and the bottom-side regions 1580 and 1680. The first reinforcement seals 391c are formed in areas overlapping with the sealing through-holes 169.

The first point-seal forming unit U10 is a component that operates to perform the heat sealing in the first point-seal forming process P10. The specific structure of the first point-seal forming unit U10 is not limited and may include conventionally known components for heat sealing, such as a heat sealing die provided with a built-in heater, and a cooling unit for cooling a portion that is heat sealed by the sealing die.

<First Cutting Process P11 and First Cutting Unit U11>

Figure 12:
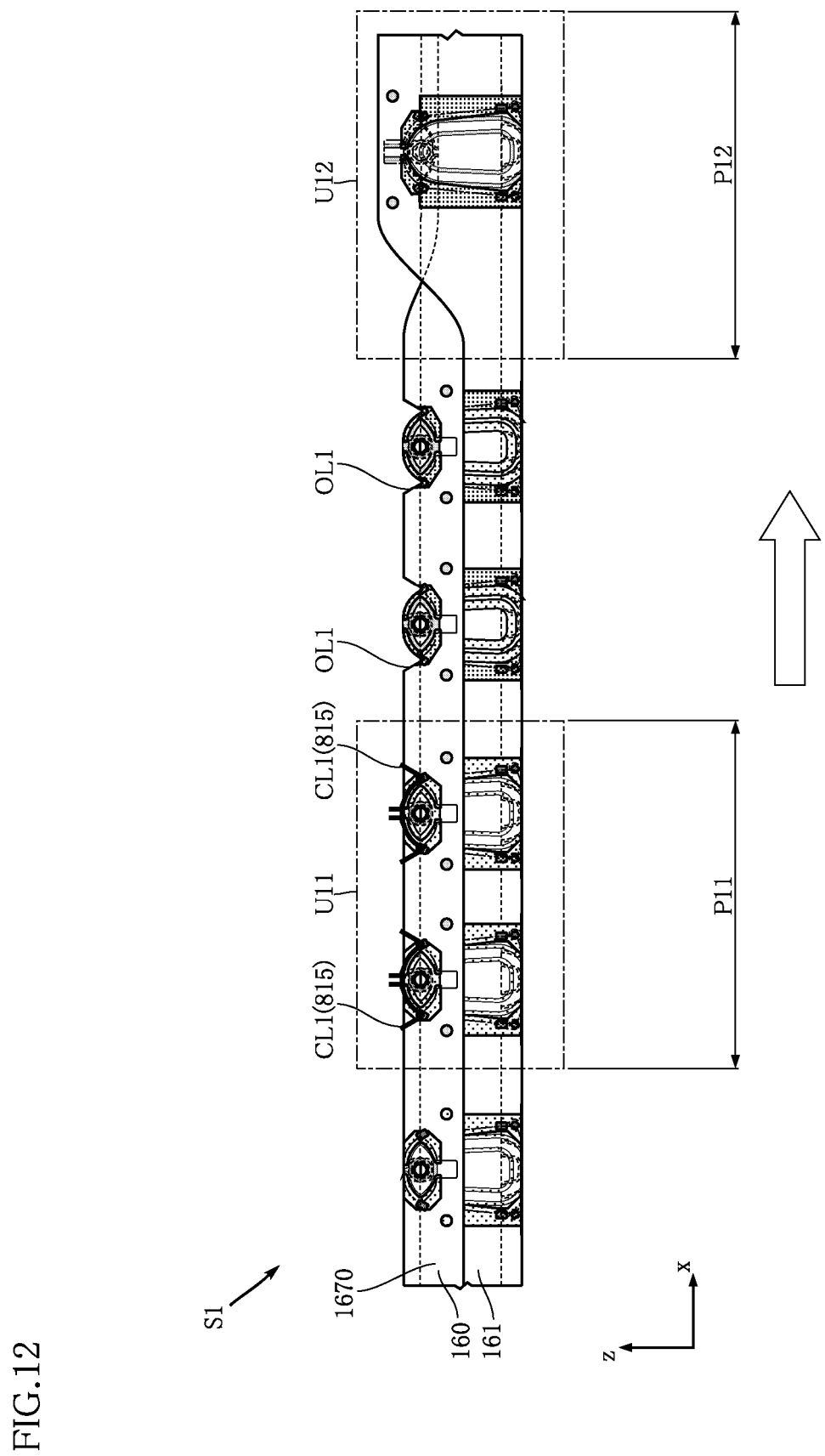
FIG. 12 is a fragmentary front view illustrating the pouch-type packaging material manufacturing method and the pouch-type packaging material manufacturing device according to the first embodiment of the present invention.
Figure 13:
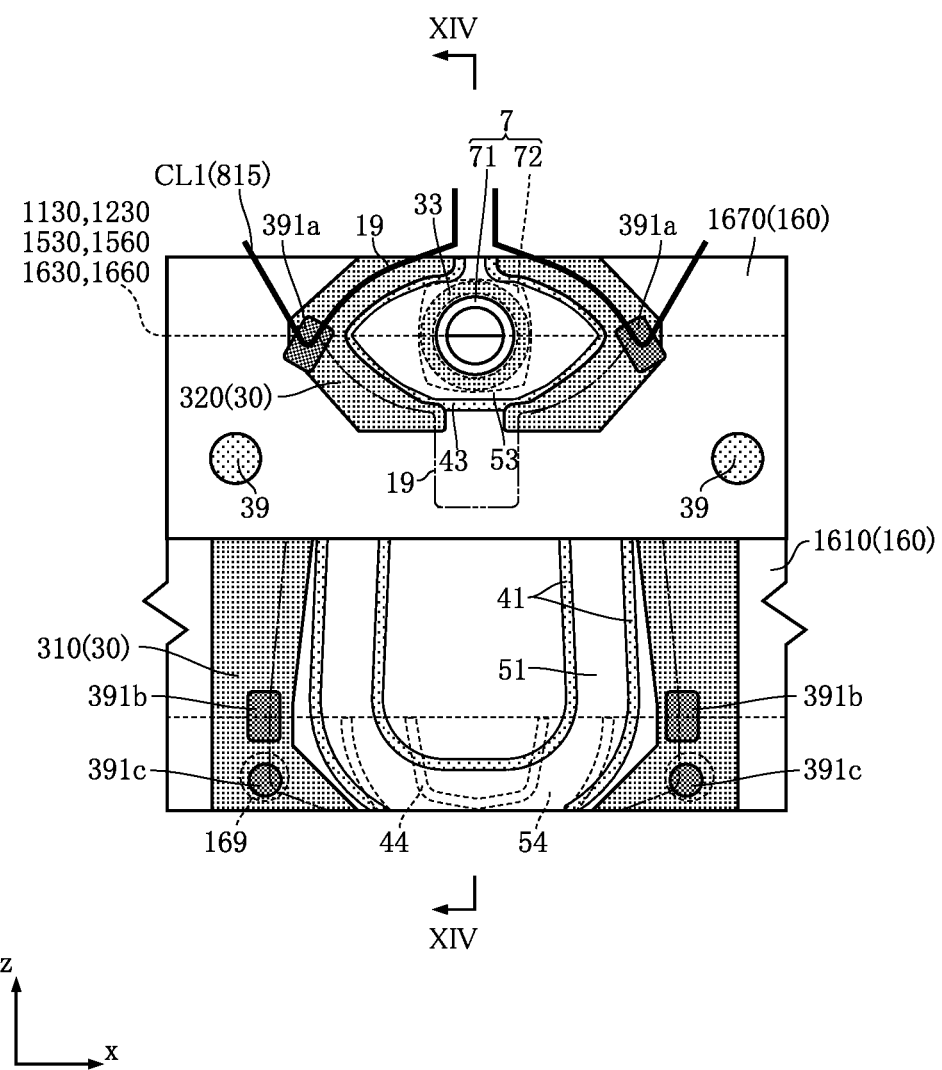
FIG. 13 is a fragmentary front view illustrating a first cutting process of the pouch-type packaging material manufacturing method according to the first embodiment of the present invention.

Next, the first cutting process P11 is performed at the first cutting unit U11 as shown in FIG. 12. In the first cutting process P11, the raw material sheet 10, the first structural sheet material 150, and the second structural sheet material 160 after the first folding process P9 (and the first point-seal forming process P10) are cut along a first cutting line CL1. As shown in FIG. 13, the first cutting line CL1 extends from a portion where the top-side sheet material 130 and the top-side regions 1570 and 1670 overlap with the second sub-regions 1220, 1550 and 1650 (a portion closer toward the top side in the z direction beyond the first boundary line 1130, the second boundary line 1230, the first boundary line 1530, the second boundary line 1560, the first boundary line 1630 and the second boundary line 1660) to a portion closer toward the bottom side in the z direction beyond the first boundary lines 1130, 1530 and 1630. In the illustrated example, two first cutting lines CL1 are defined on the both sides in the x direction. Between the two first cutting lines CL1 in the x direction, the top-side structural seal 43, the top-side filler-enclosing portion 53 and the spout 7 are located. FIG. 13 is a plan view showing a portion of the raw material sheet 10, the first structural sheet material 150, and the second structural sheet material 160 in the x direction. The illustrated portion of the raw material sheet 10, the first structural sheet material 150, and the second structural sheet material 160 is of a length enough for fabricating one piece of pouch-type packaging material A1.

Figure 14:
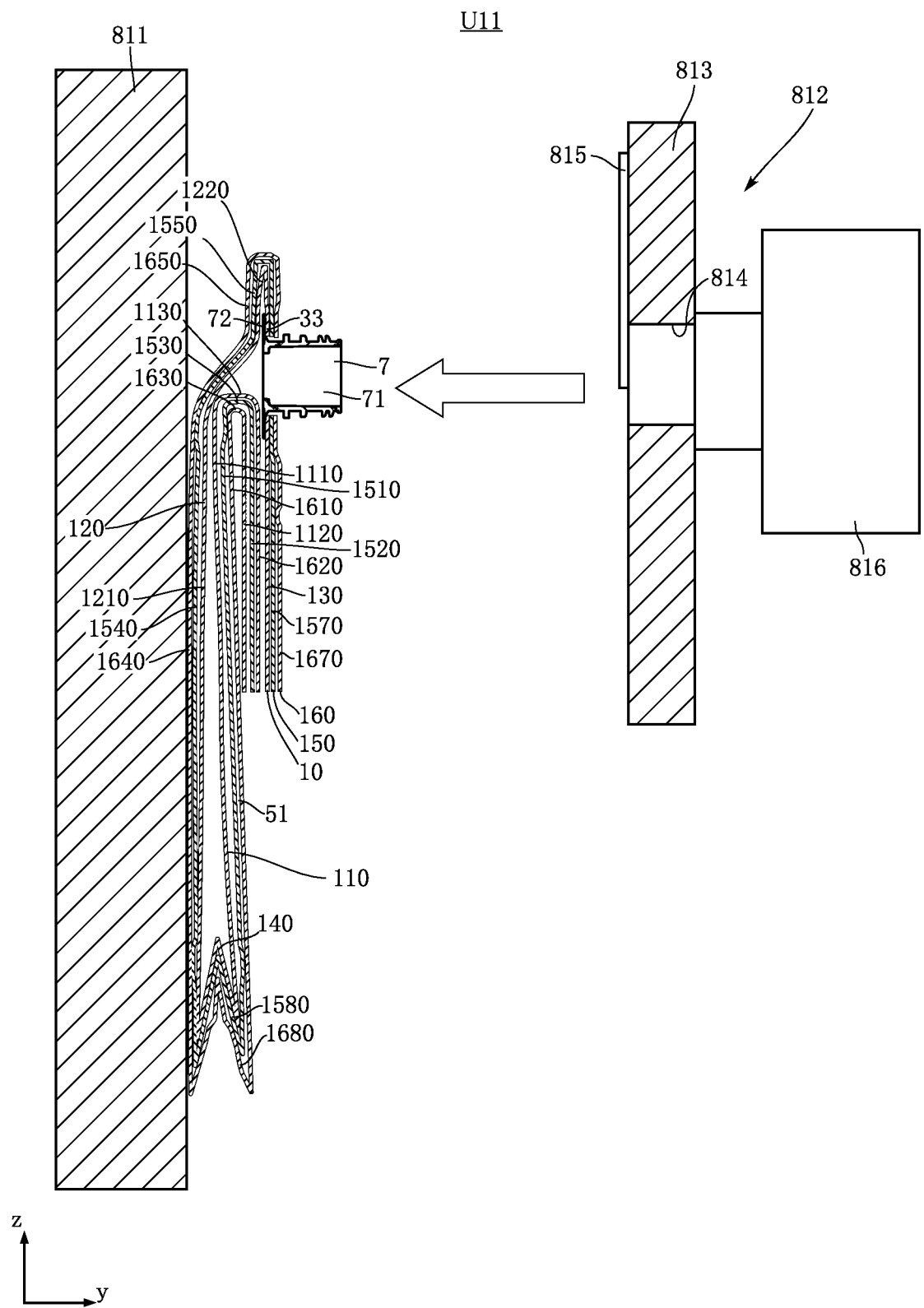
FIG. 14 is a sectional view taken along line XIV-XIV of FIG. 13.

The first cutting unit U11 is a component that operates to perform the cutting in the first cutting process P11. The specific structure of the first cutting unit U11 is not limited and may include a cutting blade, a cutting die and/or a laser as desired. Preferably, the first cutting unit U11 may include a cutting blade, such as Thomson blade, which is suitable for cutting laminated films used to fabricate pouch-type packaging materials and allows the change of a cutting shape easily. In the present embodiment, the first cutting unit U11 includes a base part 811 and a cutting part 812 as shown in FIG. 14. The base part 811 is located on one side of the raw material sheet 10, the first structural sheet material 150, and the second structural sheet material 160 in the y direction to receive the raw material sheet 10, the first structural sheet material 150, and the second structural sheet material 160 when the cutting force is applied. The cutting part 812 is for cutting the raw material sheet 10, the first structural sheet material 150, and the second structural sheet material 160. In the illustrated example, the cutting part 812 includes a support 813, a cutting blade 815, and a driving cylinder 816. The support 813 is a component supporting the cutting blade 815. The cutting blade 815 is a blade for cutting the raw material sheet 10, the first structural sheet material 150, and the second structural sheet material 160. The shape of the cutting blade 815 as viewed in the y direction matches the shape of the first cutting lines CL1 shown in FIG. 14. The driving cylinder 816 provides a drive force for moving the support 813 and the cutting blade 815 toward and away from the base part 811. The support 813 has a through-hole 814. The through-hole 814 is provided for accommodating the spout 7 when the support 813 and the cutting blade 815 are moved toward the base part 811, so that interference with the spout 7 can be avoided.

Figure 15:
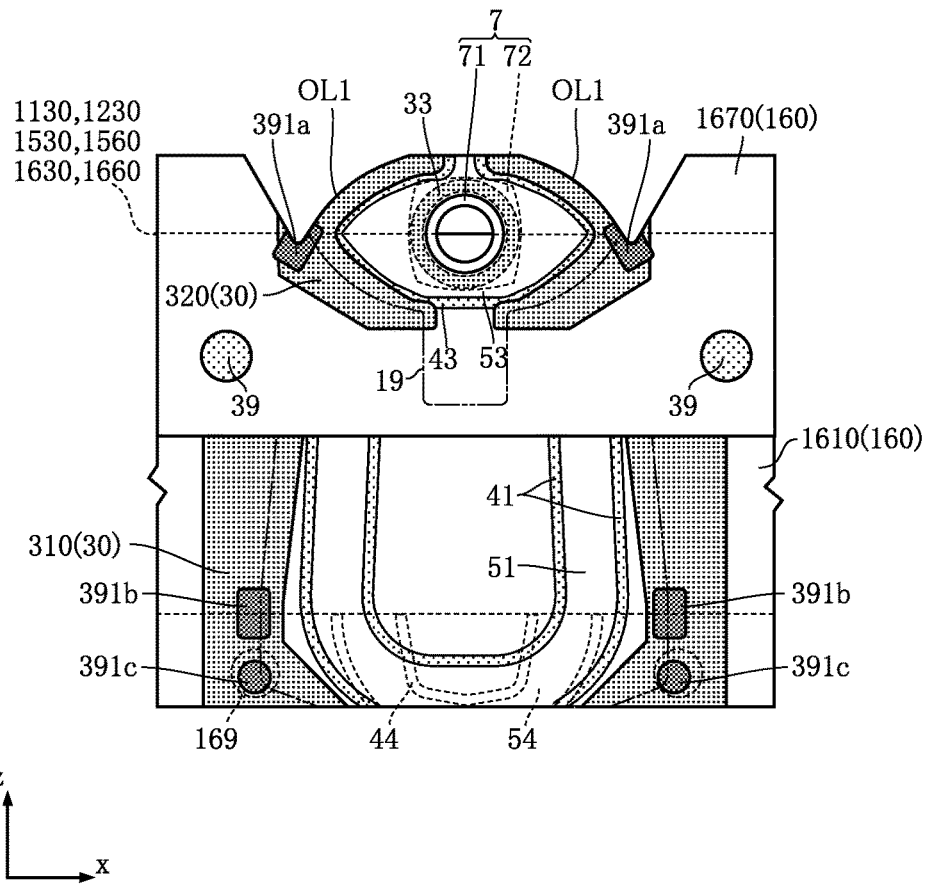
FIG. 15 is a fragmentary front view showing the state after the first cutting process of the pouch-type packaging material manufacturing method according to the first embodiment of the present invention.
Figure 16:
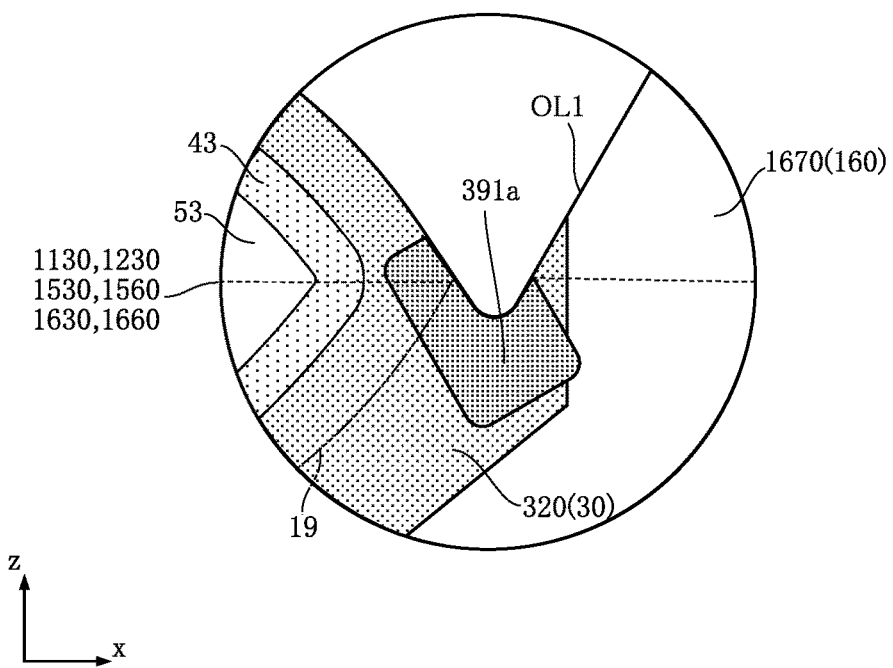
FIG. 16 is an enlarged fragmentary front view showing the state after the first cutting process of the pouch-type packaging material manufacturing method according to the first embodiment of the present invention.

As showing in FIGS. 15 and 16, once the first cutting process P11 is completed, the raw material sheet 10, the first structural sheet material 150, and the second structural sheet material 160 have a first outline OL1. The first outline OL1 extends across the first boundary lines 1130, 1530 and 1630 and intersects each first reinforcement seal 391a. FIG. 15 is a plan view showing a portion of the raw material sheet 10, the first structural sheet material 150, and the second structural sheet material 160 in the x direction. The illustrated portion of the raw material sheet 10, the first structural sheet material 150, and the second structural sheet material 160 is of a length enough for fabricating one piece of pouch-type packaging material A1.

<Second Folding Process P12 and Second Folding Unit U12>

Figure 23:
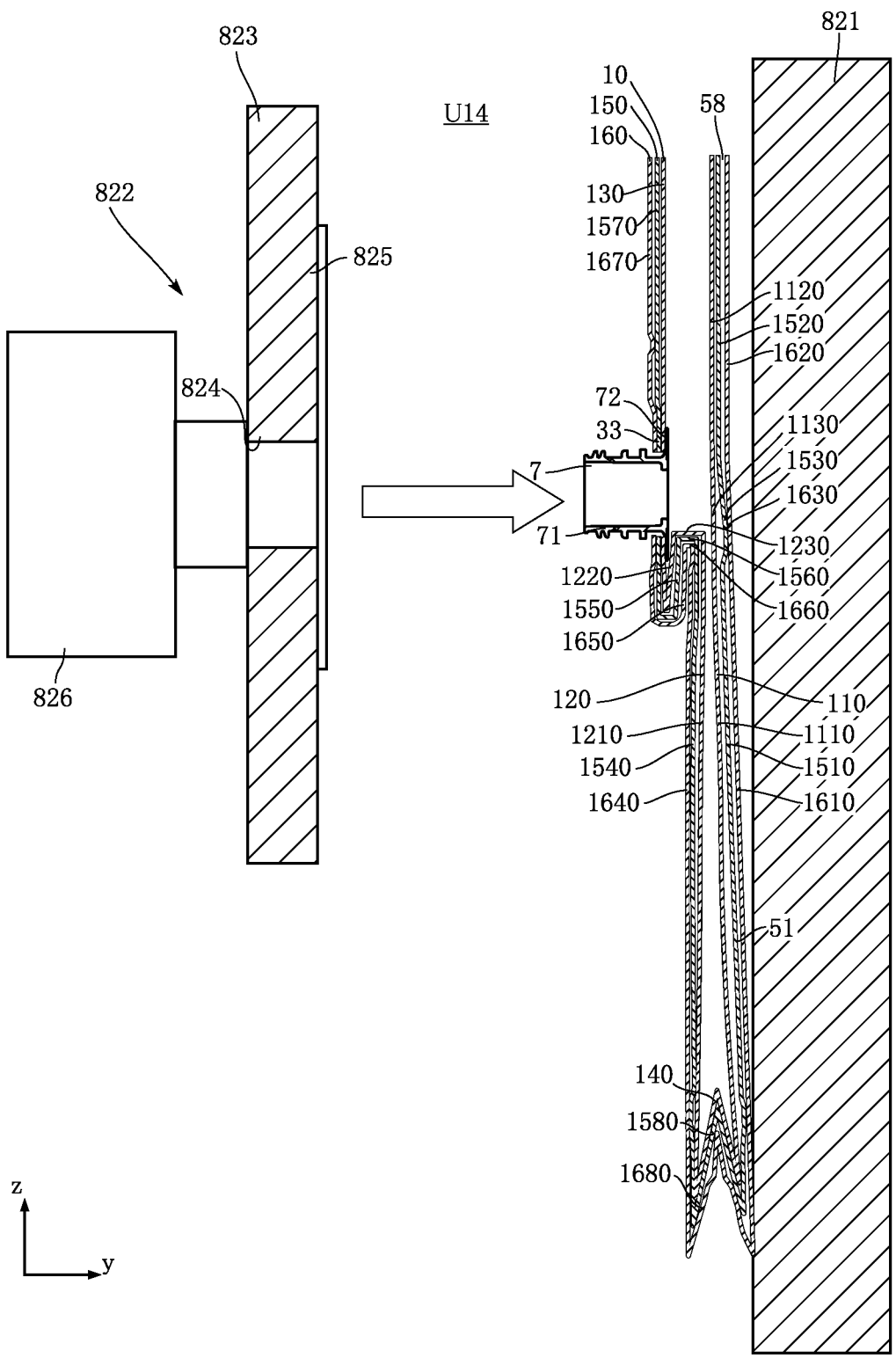
FIG. 23 is a sectional view taken along line XXIII-XXIII of FIG. 20.

Next, the second folding process P12 is performed at the second folding unit U12 as shown in FIG. 12. In the second folding process P12, a mountain fold is made along the second boundary lines 1230, 1560 and 1660. As a result, as shown in FIG. 23, the first body sheet material 110, the first main region 1510, the first sub-region 1520, the first main region 1610, and the first sub-region 1620 are aligned in the z direction. In addition, the second sub-regions 1220, 1550 and 1650 are overlaid on the second main regions 1210, 1540 and 1640 along the z direction. In addition, the top-side sheet material 130 and the top-side regions 1570 and 1670 are held along the z direction on the opposite side of the second main region 1210 across the second sub-regions 1220, 1550 and 1650 in the y direction.

The second folding unit U12 is a component that operates to perform the folding in the second folding process P12. The specific structure of the second folding unit U12 is not limited, and any known sheet-folding mechanism can be used.

<Second Point-Seal Process P13 and Second Point-Seal Unit U13>

Figure 17:
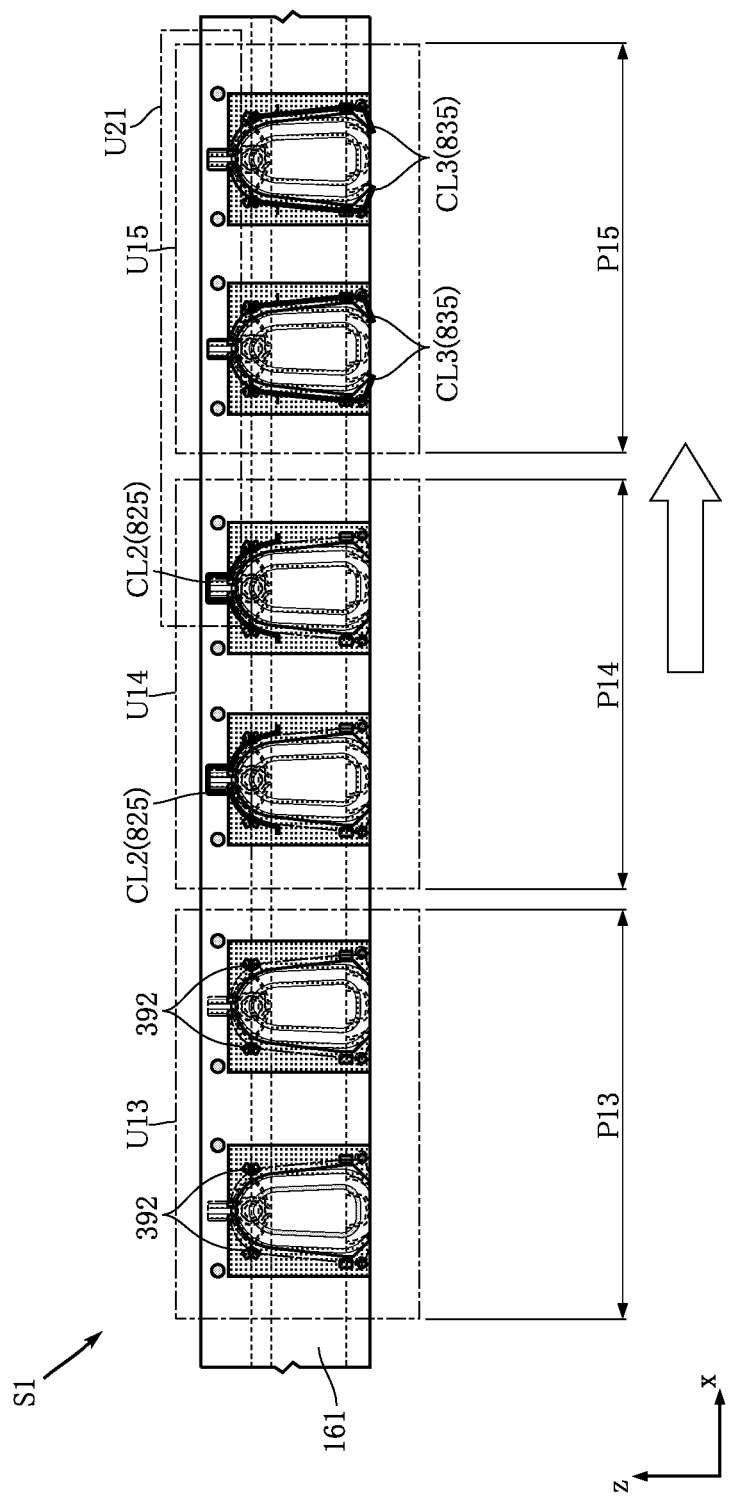
FIG. 17 is a fragmentary front view illustrating the pouch-type packaging material manufacturing method and the pouch-type packaging material manufacturing device according to the first embodiment of the present invention.
Figure 18:
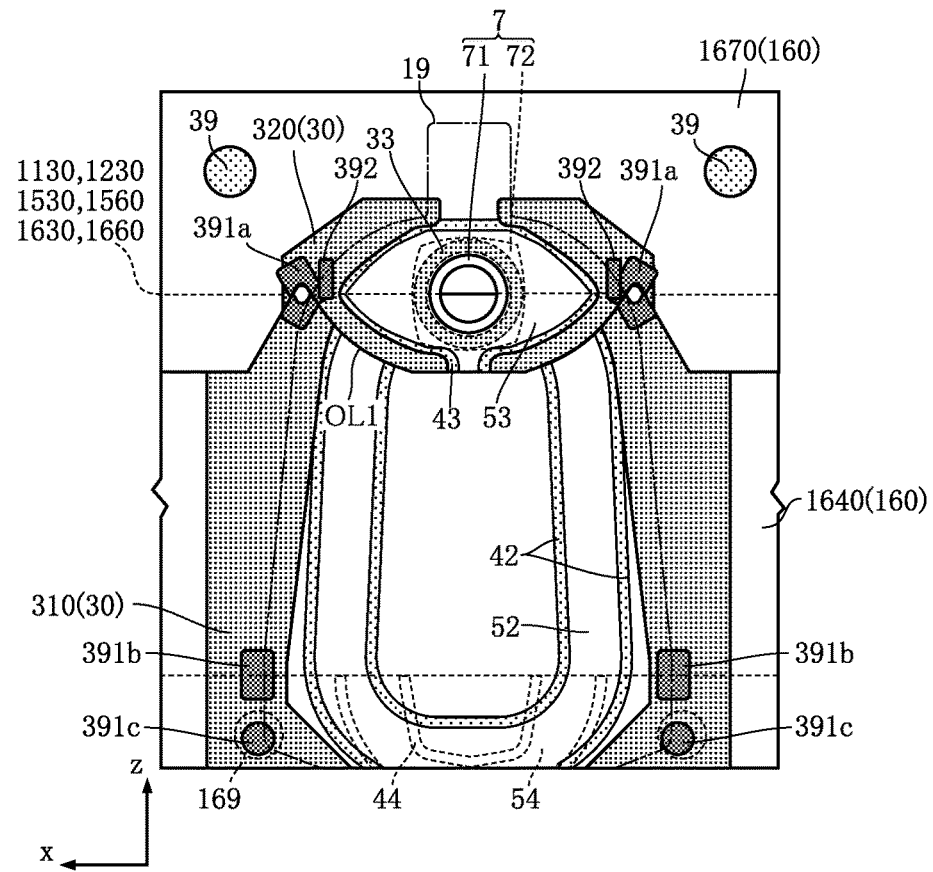
FIG. 18 is a fragmentary front view illustrating a second point-seal process of the pouch-type packaging material manufacturing method according to the first embodiment of the present invention.
Figure 19:
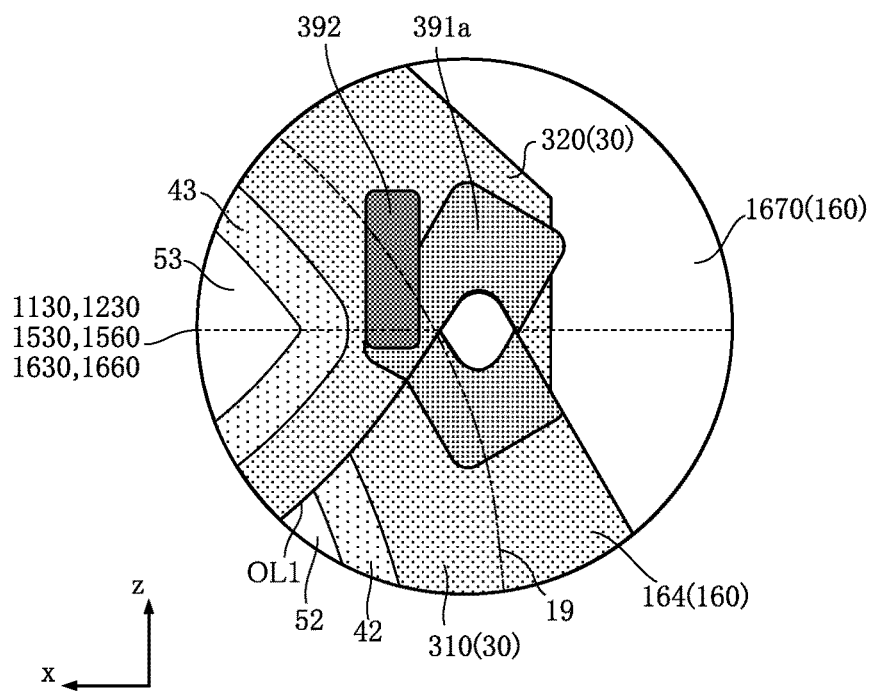
FIG. 19 is an enlarged fragmentary front view illustrating the second point-seal process of the pouch-type packaging material manufacturing method according to the first embodiment of the present invention.

Next, the second point-seal process P13 is performed at the second point-seal unit U13 as shown in FIG. 17. In the second point-seal process P13, a plurality of second reinforcement seals 392 are formed at appropriate locations in the raw material sheet 10, the first structural sheet material 150, and the second structural sheet material 160 after the second folding process P12. As shown in FIGS. 18 and 19, the second reinforcement seals 392 are formed to locally increase the seal strength of the seal 30. FIG. 18 is a plan view showing a portion of the raw material sheet 10, the first structural sheet material 150, and the second structural sheet material 160 in the x direction. The illustrated portion of the raw material sheet 10, the first structural sheet material 150, and the second structural sheet material 160 is of a length enough for fabricating one piece of pouch-type packaging material A1. As shown in FIG. 19, in the illustrated example, each second reinforcement seal 392 overlaps with the top-side seal 320 and extends from an area enclosed by the package outline 19 and the first outline OL1 to an area closer toward the top side in the z direction beyond the package outline 19. Note, however, that the second reinforcement seal 392 does not reach the first outline OL1.

The second point-seal unit U13 is a component that operates to perform the heat sealing in the second point-seal process P13. The specific structure of the second point-seal unit U13 is not limited and may include conventionally known components for heat sealing, such as a heat sealing die provided with a built-in heater, and a cooling unit for cooling a portion that is heat sealed by the sealing die.

<Second Cutting Process P14 and Second Cutting Unit U14>

Figure 20:
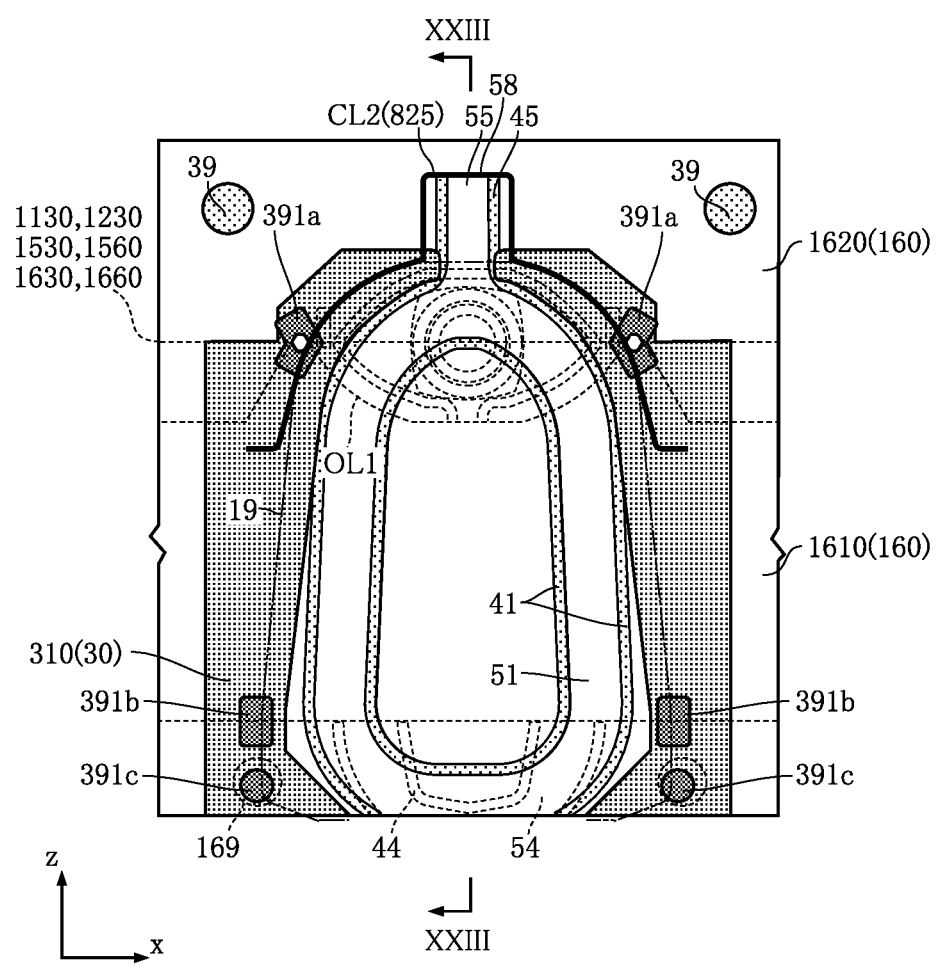
FIG. 20 is a fragmentary front view illustrating a second cutting process of the pouch-type packaging material manufacturing method according to the first embodiment of the present invention.
Figure 21:
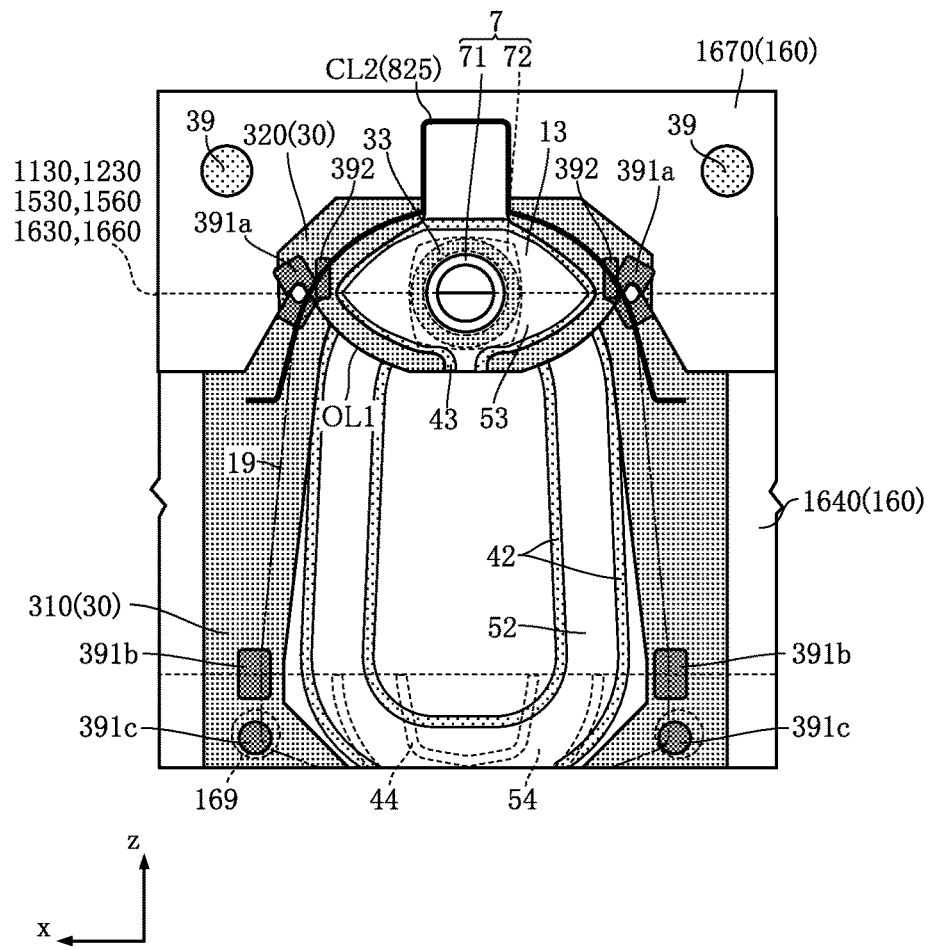
FIG. 21 is a fragmentary rear view illustrating the second cutting process of the pouch-type packaging material manufacturing method according to the first embodiment of the present invention.

Next, the second cutting process P14 is performed at the second cutting unit U14 as shown in FIG. 17. In the second cutting process P14, the raw material sheet 10, the first structural sheet material 150, and the second structural sheet material 160 after the second folding process P12 (and the second point-seal process P13) are cut along a second cutting line CL2. As shown in FIGS. 20, 21, 22 and 23, the second cutting line CL2 extends from a portion where the top-side sheet material 130 and the top-side regions 1570 and 1670 overlap with the first sub-regions 1120, 1520 and 1620 (a portion closer toward the top side in the z direction beyond the first boundary lines 1130, the second boundary line 1230, the first boundary line 1530, the second boundary line 1560, the first boundary line 1630 and the second boundary line 1660) to a portion closer toward the bottom side the z direction beyond the first boundary line 1130, the second boundary line 1230, the first boundary line 1530, the second boundary line 1560, the first boundary line 1630 and the second boundary line 1660. The second cutting line CL2 intersects the first outline OL1. Each of FIGS. 20 and 21 is a plan view showing a portion of the raw material sheet 10, the first structural sheet material 150, and the second structural sheet material 160 in the x direction. The illustrated portion of the raw material sheet 10, the first structural sheet material 150, and the second structural sheet material 160 is of a length enough for fabricating one piece of pouch-type packaging material A1.

Figure 22:
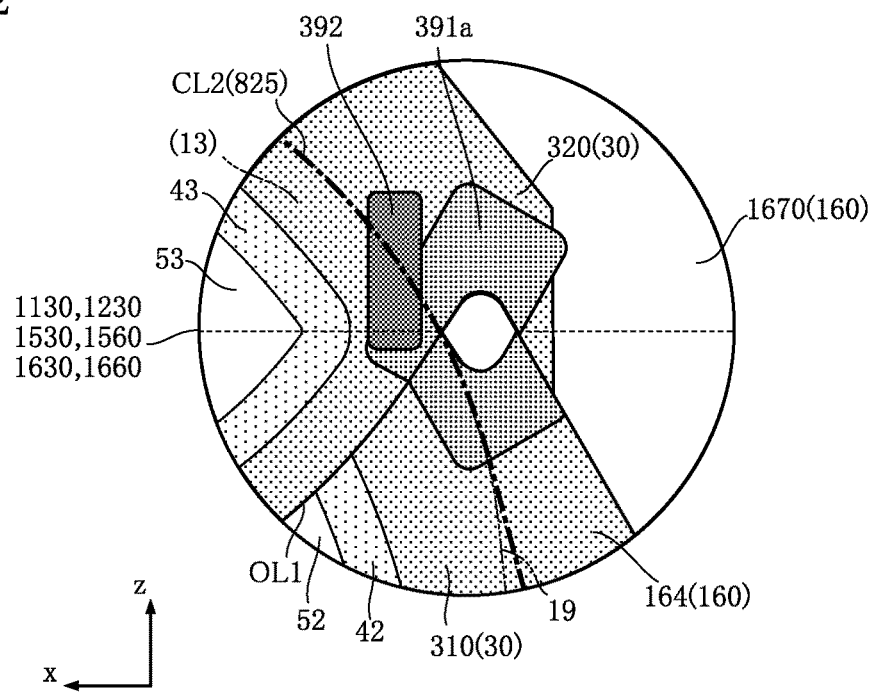
FIG. 22 is an enlarged fragmentary rear view illustrating the second cutting process of the pouch-type packaging material manufacturing method according to the first embodiment of the present invention.
Figure 25:
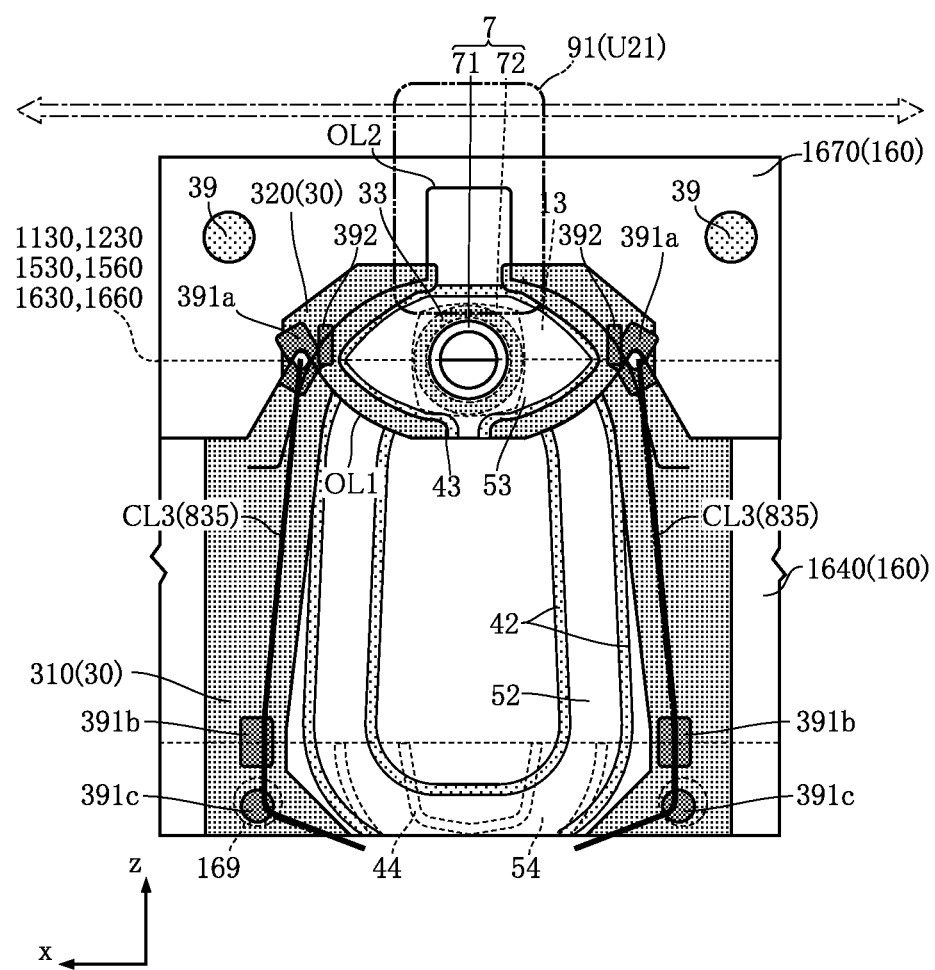
FIG. 25 is a fragmentary rear view illustrating the third cutting process of the pouch-type packaging material manufacturing method according to the first embodiment of the present invention.

As shown in FIGS. 20 to 22, the second cutting line CL2 of the illustrated example is a single line that includes a line segment on the top side of the spout 7 in the z direction and two line segments extending therefrom along the opposite sides of the spout 7 in the x direction toward the bottom side in the z direction to reach the first outline OL1. The spout 7, the top-side structural seal 43, and the top-side filler-enclosing portion 53 are located between the two line segments. As shown in FIG. 22, the second cutting line CL2 intersects each second reinforcement seal 392. In addition, the second cutting line CL2 is smoothly connected to the package outline 19. By cutting along the second cutting line CL2, a second outline OL2 is formed as shown in FIG. 25. The area of the top-side sheet material 130 enclosed by the first outline OL1 and the second outline OL2 is thus separated and serves as a top-side sheet 13.

The second cutting unit U14 is a component that operates to perform the cutting in the second cutting process P14. The specific structure of the second cutting unit U14 is not limited and may include a cutting blade, a cutting die and/or a laser as desired. Preferably, the structure for performing the second cutting process P14 may include a cutting blade, such as Thomson blade, which is suitable for cutting laminated films used to fabricate pouch-type packaging materials and allows the change of a cutting shape easily. In the present embodiment, a base part 821 and a cutting part 822 are included as shown in FIG. 23. The base part 821 is located on one side of the raw material sheet 10, the first structural sheet material 150, and the second structural sheet material 160 in the y direction to receive the raw material sheet 10, the first structural sheet material 150, and the second structural sheet material 160 when the cutting force is applied. The cutting part 822 is for cutting the raw material sheet 10, the first structural sheet material 150, and the second structural sheet material 160. In the illustrated example, the cutting part 822 includes a support 823, a cutting blade 825, and a driving cylinder 826. The support 823 is a component supporting the cutting blade 825. The cutting blade 825 is a blade for cutting the raw material sheet 10, the first structural sheet material 150, and the second structural sheet material 160. The shape of the cutting blade 825 as viewed in the y direction matches the shape of the second cutting line CL2 shown in FIGS. 20 to 22. The driving cylinder 826 provides a drive force for moving the support 823 and the cutting blade 825 toward and away from the base part 821. The support 823 has a through-hole 824. The through-hole 824 is provided for accommodating the spout 7 when the support 823 and the cutting blade 825 are moved toward the base part 821, so that interference with the spout 7 can be avoided.

Figure 24:
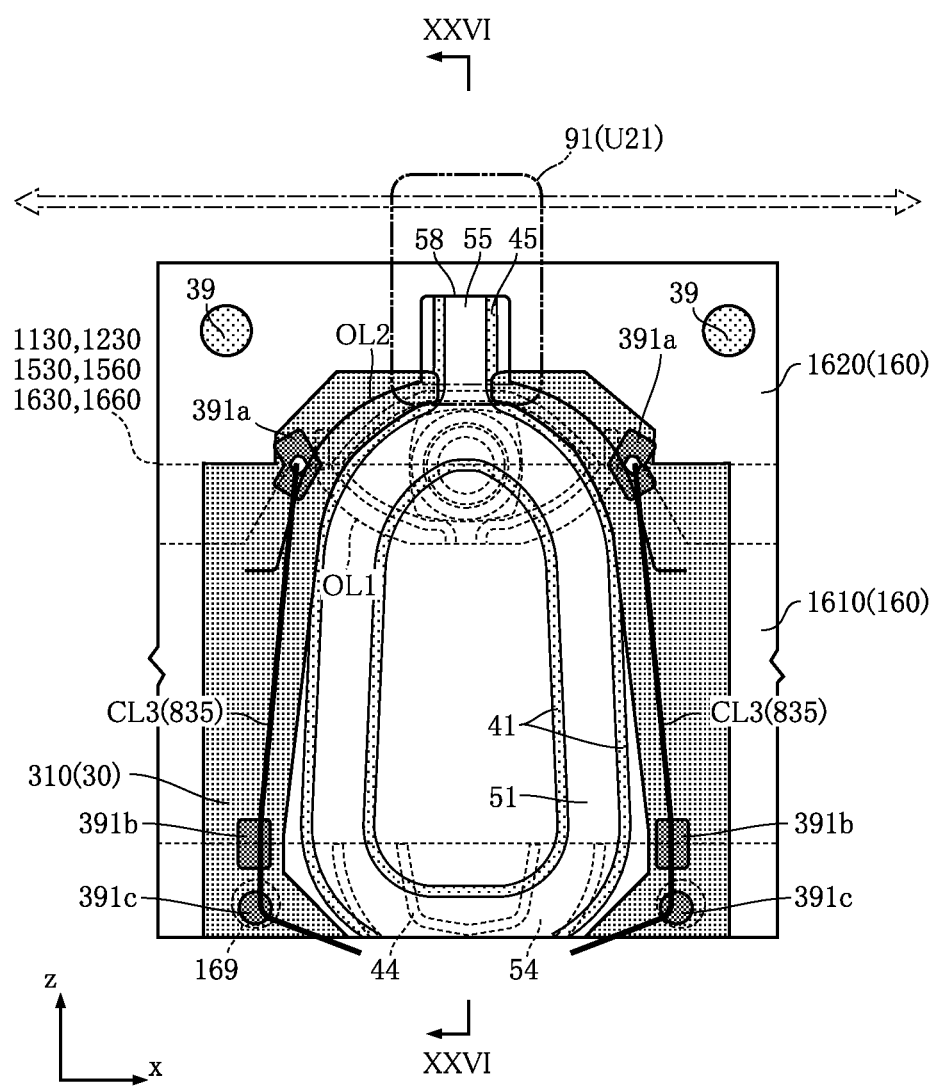
FIG. 24 is a fragmentary front view illustrating a third cutting process of the pouch-type packaging material manufacturing method according to the first embodiment of the present invention.
Figure 26:
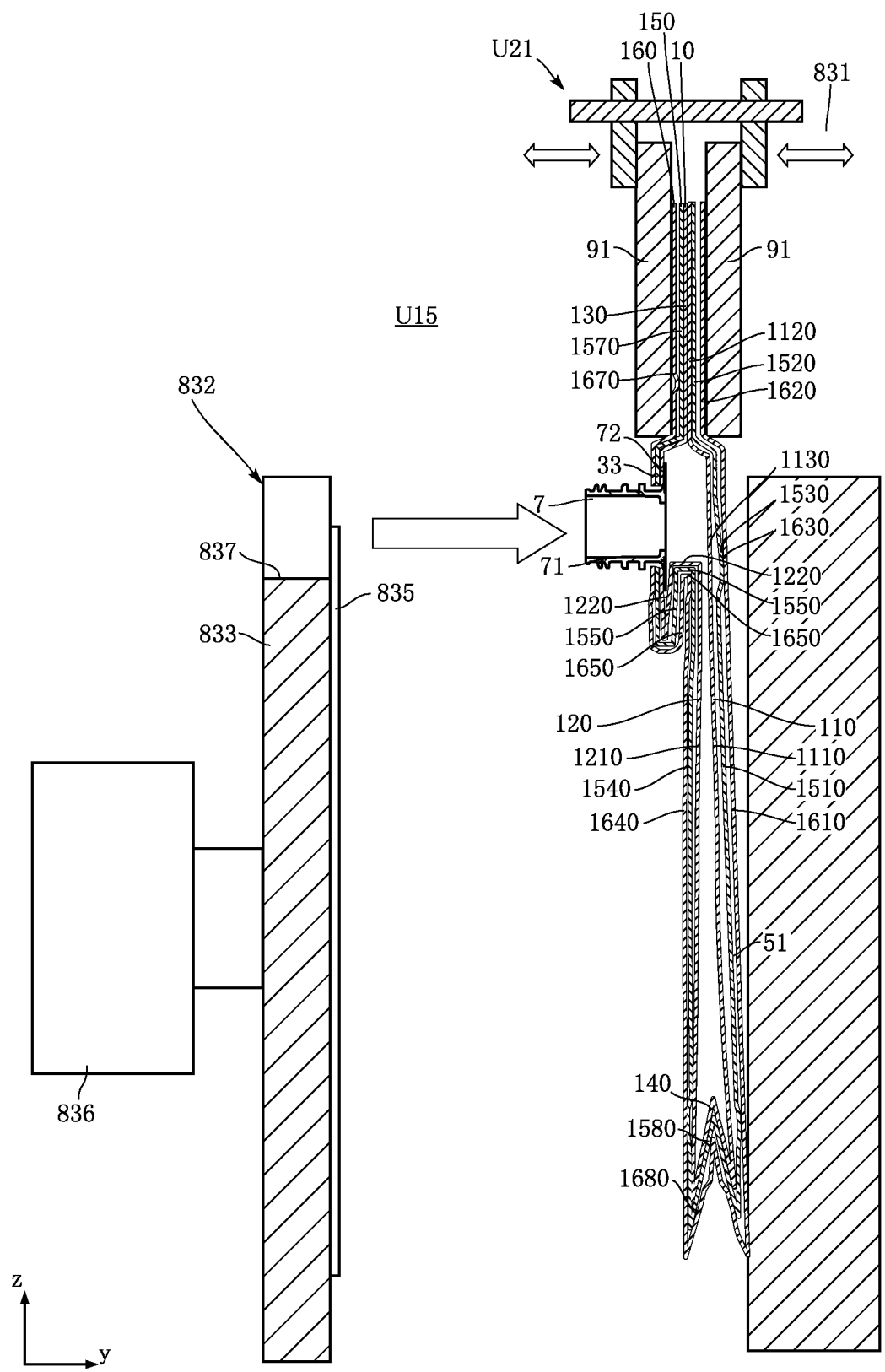
FIG. 26 is a sectional view taken along line XXVI-XXVI of FIG. 24.

The raw material sheet 10, the first structural sheet material 150, and the second structural sheet material 160 after the second cutting process P14 by the second cutting unit U14 are conveyed to the third cutting unit U15 by the conveyor unit U21. As shown in FIGS. 24, 25 and 26, the conveyor unit U21 includes a pair of gripper parts 91. The pair of gripper parts 91, which can be moved toward and away from each other in the y direction, are moved toward each other to clamp the raw material sheet 10, the first structural sheet material 150, and the second structural sheet material 160 from the top side in the z direction. Note that the pair of gripper parts 91 clamp the portion that is away from the second outline OL2 the in the z direction. In this state, the conveyor unit U21 can move the pair of gripper parts 91 in the x direction. The conveyor unit U21 is driven by a drive source, such as a motor or an air cylinder, as appropriate.

<Third Cutting Process P15 and Third Cutting Unit U15>

Next, the third cutting process P15 is performed at the third cutting unit U15 as shown in FIG. 17. In the third cutting process P15, the raw material sheet 10, the first structural sheet material 150, and the second structural sheet material 160 after the second cutting process P14 are cut along a pair of third cutting line CL3 while the pair of gripper parts 91 still clamp the portion that is away the second outline OL2. As shown in FIGS. 24 to 26, each third cutting line CL3 reaches the second outline OL2 and also reaches the bottom edge of each of the first main region 1610 and the second main region 1640 in the z direction. In illustrated example, each third cutting line CL3 intersects a first reinforcement seal 391*b* and a first reinforcement seal 391*c*. In addition, each third cutting lines CL3 smoothly connects to the second outline OL2. Each of FIGS. 24 and 25 is a plan view showing a portion of the raw material sheet 10, the first structural sheet material 150, and the second structural sheet material 160 in the x direction. The illustrated portion of the raw material sheet 10, the first structural sheet material 150, and the second structural sheet material 160 is of a length enough for fabricating one piece of pouch-type packaging material A1.

The third cutting unit U15 is a component that operates to perform the cutting in the third cutting process P15. The specific structure of the third cutting unit U15 is not limited and may include a cutting blade, a cutting die and/or a laser as desired. Preferably, the structure for performing the third cutting process P15 may include a cutting blade, such as Thomson blade, which is suitable for cutting laminated films used to fabricate pouch-type packaging materials and allows the change of a cutting shape easily. In the present embodiment, a base part 831 and a cutting part 832 are included as shown in FIG. 26. The base part 831 is located on one side of the raw material sheet 10, the first structural sheet material 150, and the second structural sheet material 160 in the y direction to receive the raw material sheet 10, the first structural sheet material 150, and the second structural sheet material 160 when the cutting force is applied. The cutting part 832 is for cutting the raw material sheet 10, the first structural sheet material 150, and the second structural sheet material 160. In the illustrated example, the cutting part 832 includes a support 833, a cutting blade 835, and a driving cylinder 836. The support 833 is a component supporting the cutting blade 835. The cutting blade 835 is a blade for cutting the raw material sheet 10, the first structural sheet material 150, and the second structural sheet material 160. The shape of the cutting blade 835 as viewed in the y direction matches the shape of the third cutting lines CL3 shown in FIGS. 24 and 25. The driving cylinder 836 provides a drive force for moving the support 833 and the cutting blade 835 toward and away from the base part 831. The support 833 has a recess 837. The recess 837 is provided for accommodating the spout 7 when the support 833 and the cutting blade 835 are moved toward the base part 831, so that interference with the spout 7 can be avoided.

By cutting along the third cutting line CL3 in the third cutting process P15, a third outline OL3 is formed, so that the portion enclosed by the first outline OL1, the second outline OL2, and the third outline OL3 is completely separated. In the present embodiment, the pair of gripper parts 91 of the conveyor unit U21 are still clamping the portion that is clamped in the third cutting process P15 as shown in FIGS. 24 to 26. Thus, although the portion enclosed by the first outline OL1, the second outline OL2, and the third outline OL3 has been separated in the third cutting process P15, the separated area and the non-separated area are held together by the pair of gripper parts 91.

Figure 27:
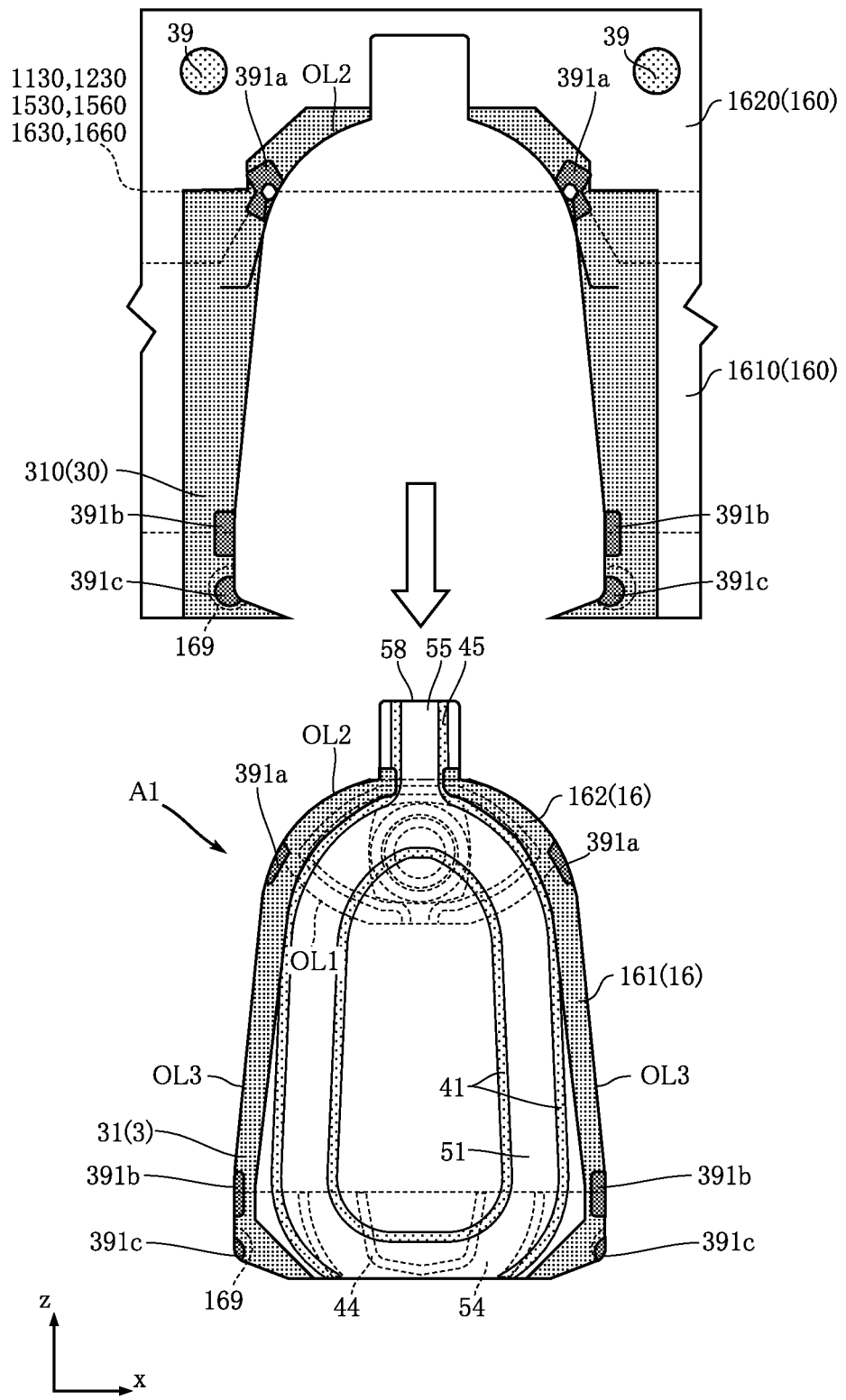
FIG. 27 is a fragmentary front view showing the state after the third cutting process of the pouch-type packaging material manufacturing method according to the first embodiment of the present invention.
Figure 28:
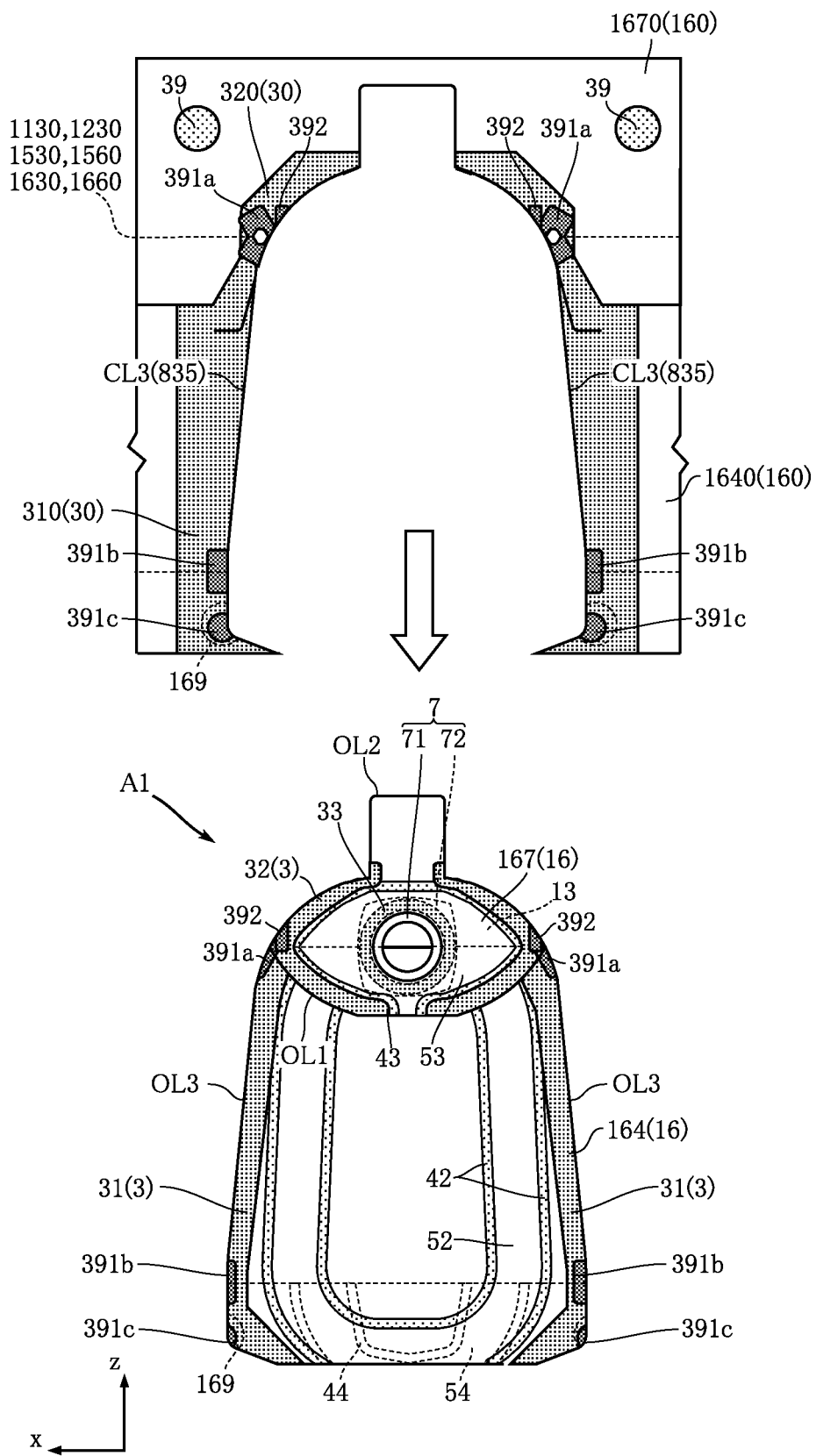
FIG. 28 is a fragmentary rear view showing the state after the third cutting process of the pouch-type packaging material manufacturing method according to the first embodiment of the present invention.
Figure 29:
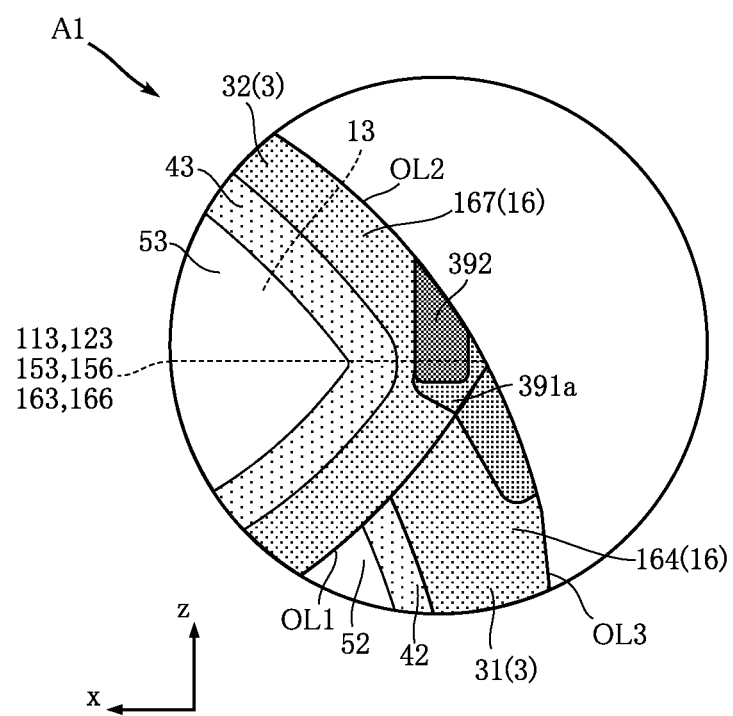
FIG. 29 is an enlarged fragmentary rear view showing the state after the third cutting process of the pouch-type packaging material manufacturing method according to the first embodiment of the present invention.
Figure 30:
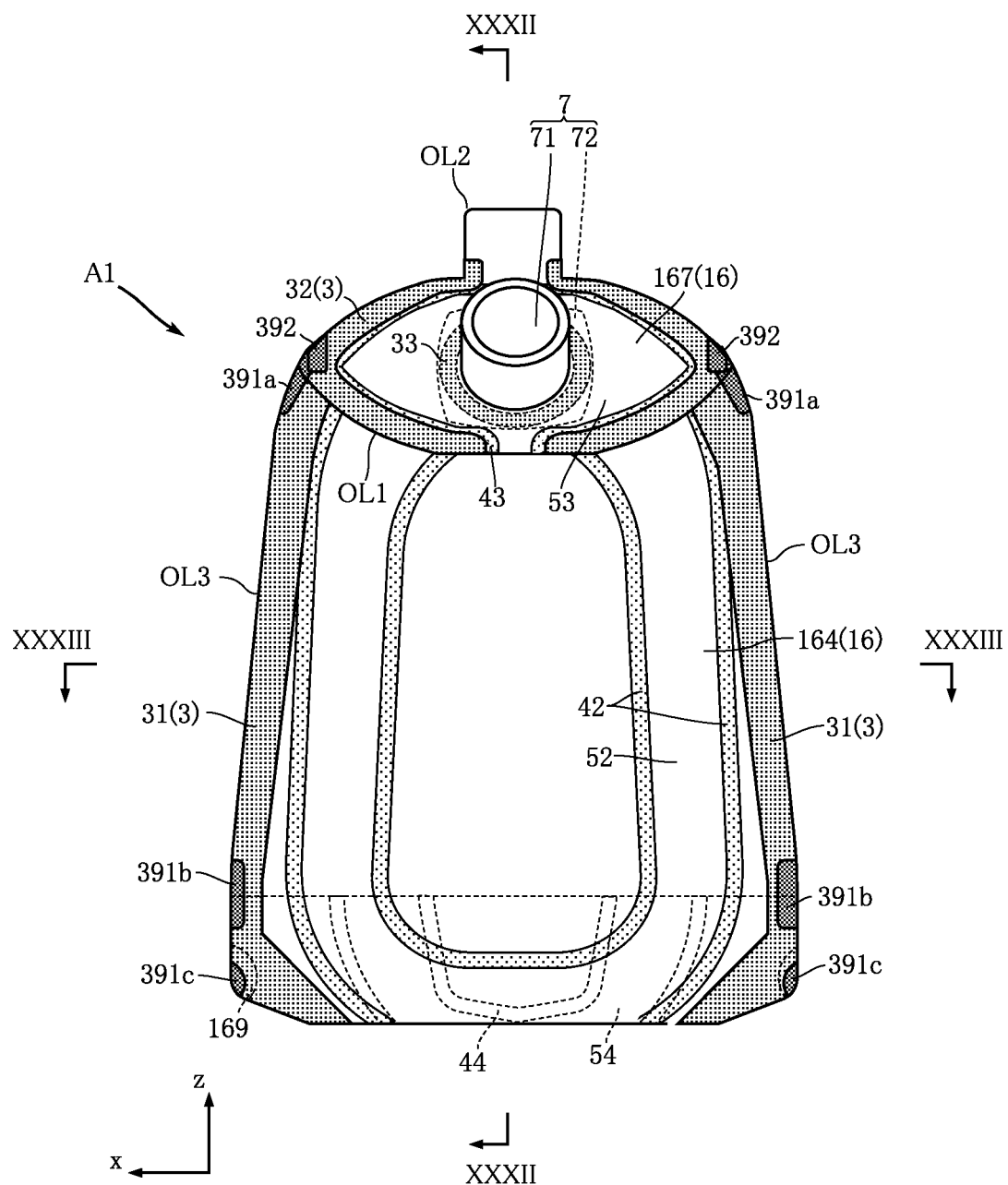
FIG. 30 is a perspective front view of a pouch-type packaging material that is manufactured by the pouch-type packaging material manufacturing method and the pouch-type packaging material manufacturing device according to the first embodiment of the present invention.
Figure 31:
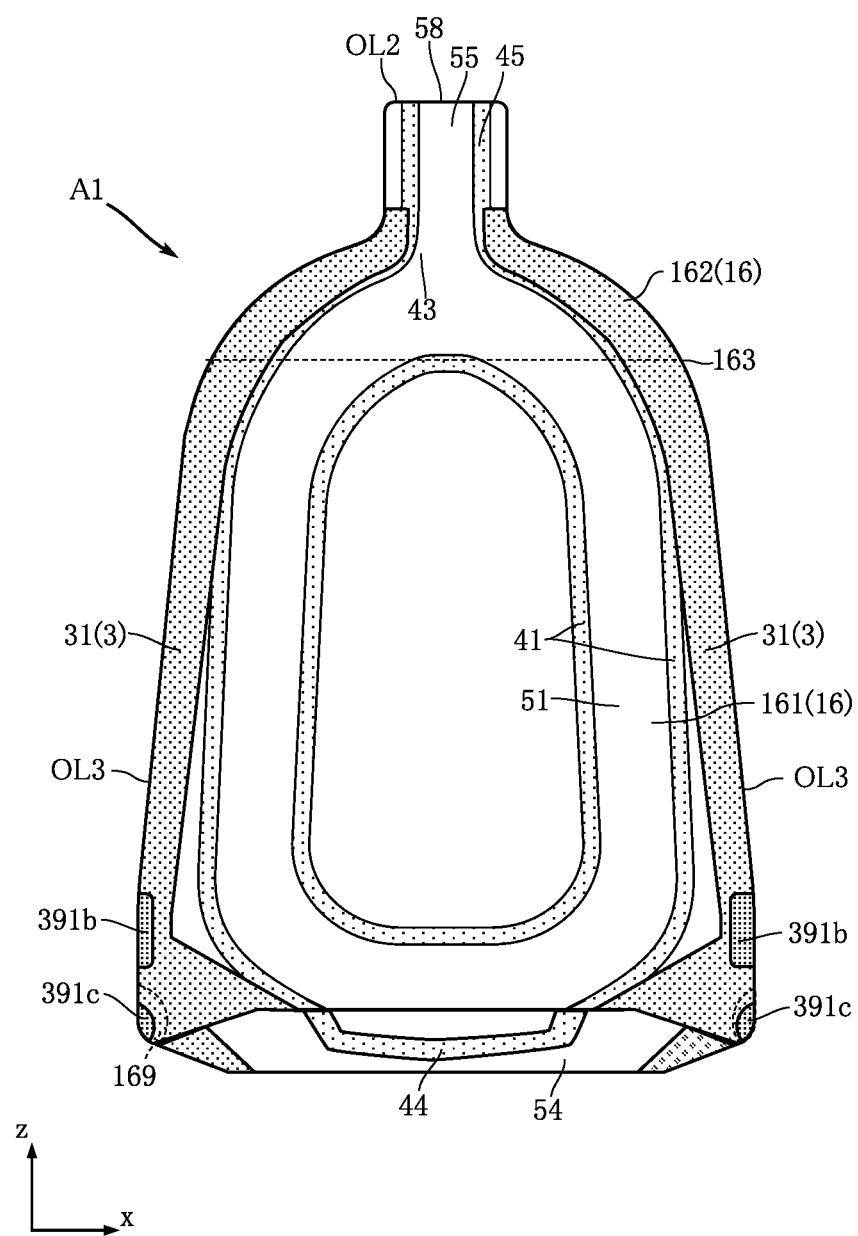
FIG. 31 is a perspective rear view of the pouch-type packaging material that is manufactured by the pouch-type packaging material manufacturing method and the pouch-type packaging material manufacturing device according to the first embodiment of the present invention.
Figure 32:
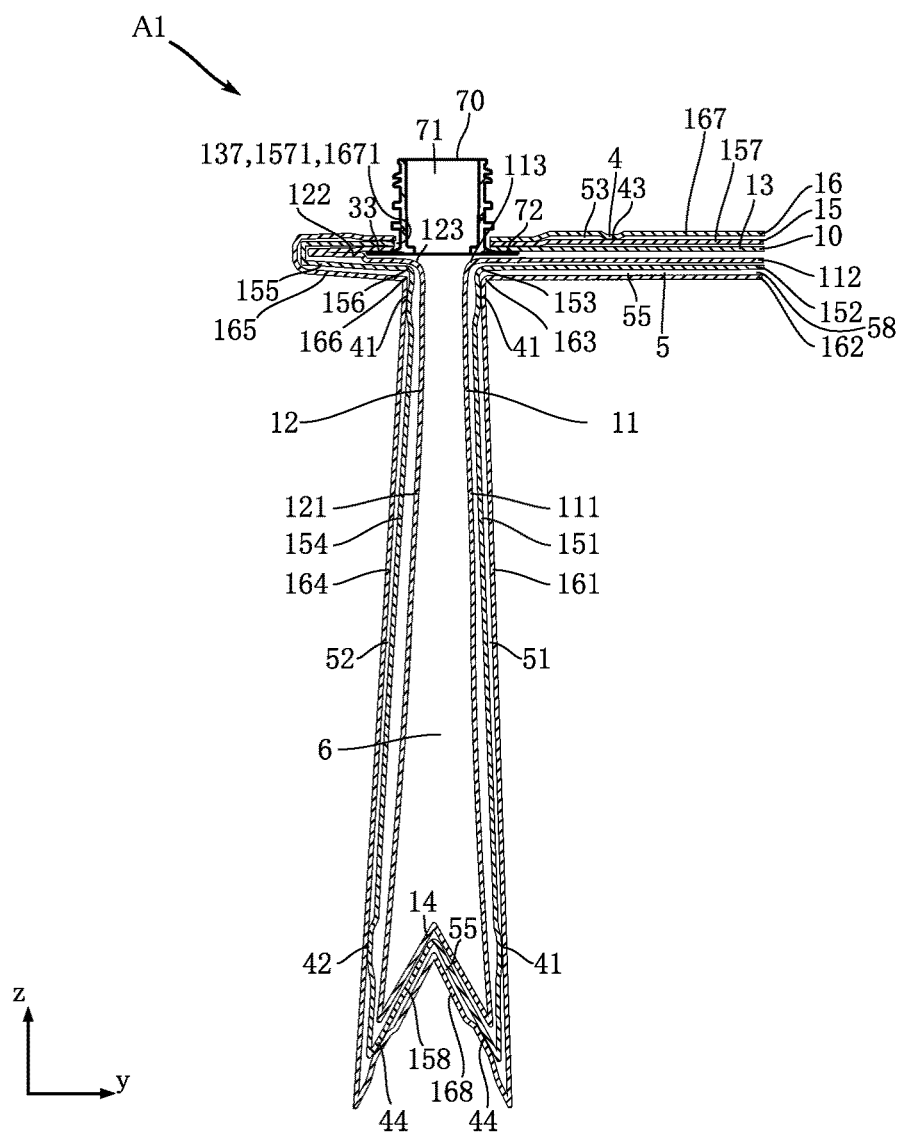
FIG. 32 is a sectional view taken along line XXXII-XXXII of FIG. 30.
Figure 33:
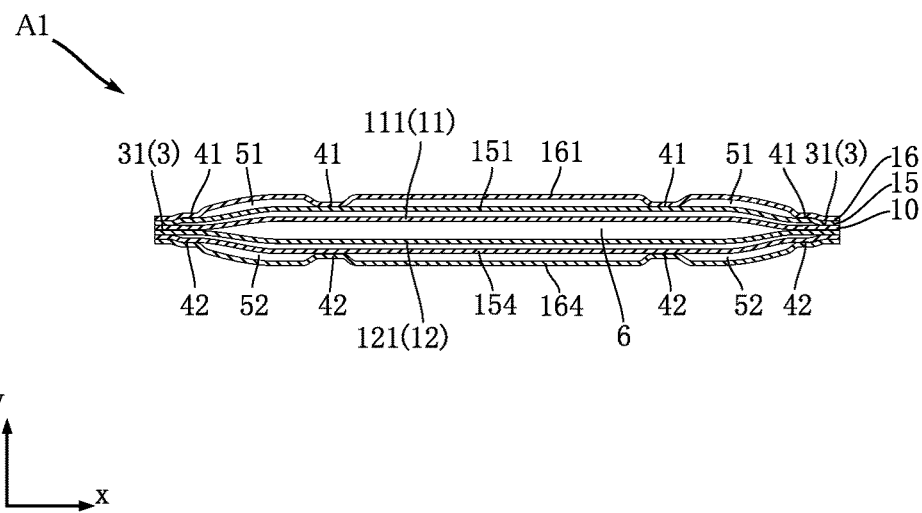
FIG. 33 is a sectional view taken along line XXXIII-XXXIII of FIG. 30.

Next, as shown in FIGS. 27 to 29, the clamping by the pair of gripper parts 91 of the conveyor unit U21 is released. As a result, the portion enclosed by the first outline OL1, the second outline OL2 and the third outline OL3 is released from the rest of the raw material sheet 10, the first structural sheet material 150, and the second structural sheet material 160. The released portion obtained in this way is a completed piece of pouch-type packaging material A1. Each of FIGS. 27 and 28 is a plan view showing a portion of the raw material sheet 10, the first structural sheet material 150, and the second structural sheet material 160 in the x direction. The illustrated portion of the raw material sheet 10, the first structural sheet material 150, and the second structural sheet material 160 is of a length enough for fabricating one piece of pouch-type packaging material A1.

<Pouch-Type Packaging Material A1>

As shown in FIGS. 30 to 33, a pouch-type packaging material A1 includes a first body sheet 11, a second body sheet 12, a top-side sheet 13, a bottom gusset sheet 14, a first structural sheet 15 and a second structural sheet 16 and a spout 7 is attached. The pouch-type packaging material A1 is formed with a seal 3, a structural seal 4, a filler-enclosing portion 5 and a content storage portion 6.

The first body sheet 11 includes a first main region 111 and a first sub-region 112 divided by a first boundary line 113. The second body sheet 12 includes a second main region 121 and a second sub-region 122 divided by a second boundary line 123.

The first structural sheet 15 includes a first main region 151 and a first sub-region 152 divided by a first boundary line 153, a second main region 154 and a second sub-region 155 divided by a second boundary line 156, and also includes a top-side region 157 and a bottom-side region 158.

The second structural sheet 16 includes a first main region 161 and a first sub-region 162 divided by a first boundary line 163, a second main region 164 and a second sub-region 165 divided by a second boundary line 166, and also includes a top-side region 167 and a bottom-side region 168.

The seal 3 includes a pair of side seals 31 and a top-side seal 32. The seal 3 joins together appropriate portions of the first body sheet 11, the second body sheet 12, the top-side sheet 13, the bottom gusset sheet 14, the first structural sheet 15 and the second structural sheet 16.

The structural seal 4 and the filler-enclosing portion 5 are configured as described above.

The content storage portion 6 is a space for holding contents 69 when the pouch-type packaging material A1 is finished as a pouch packaged product C1. The content storage portion 6 is a space surrounded by the inner surfaces of the first body sheet 11, the second body sheet 12, and the bottom gusset sheet 14. The content storage portion 6 is in communication with the spout 7.

<Pouch Container B1>

Figure 34:
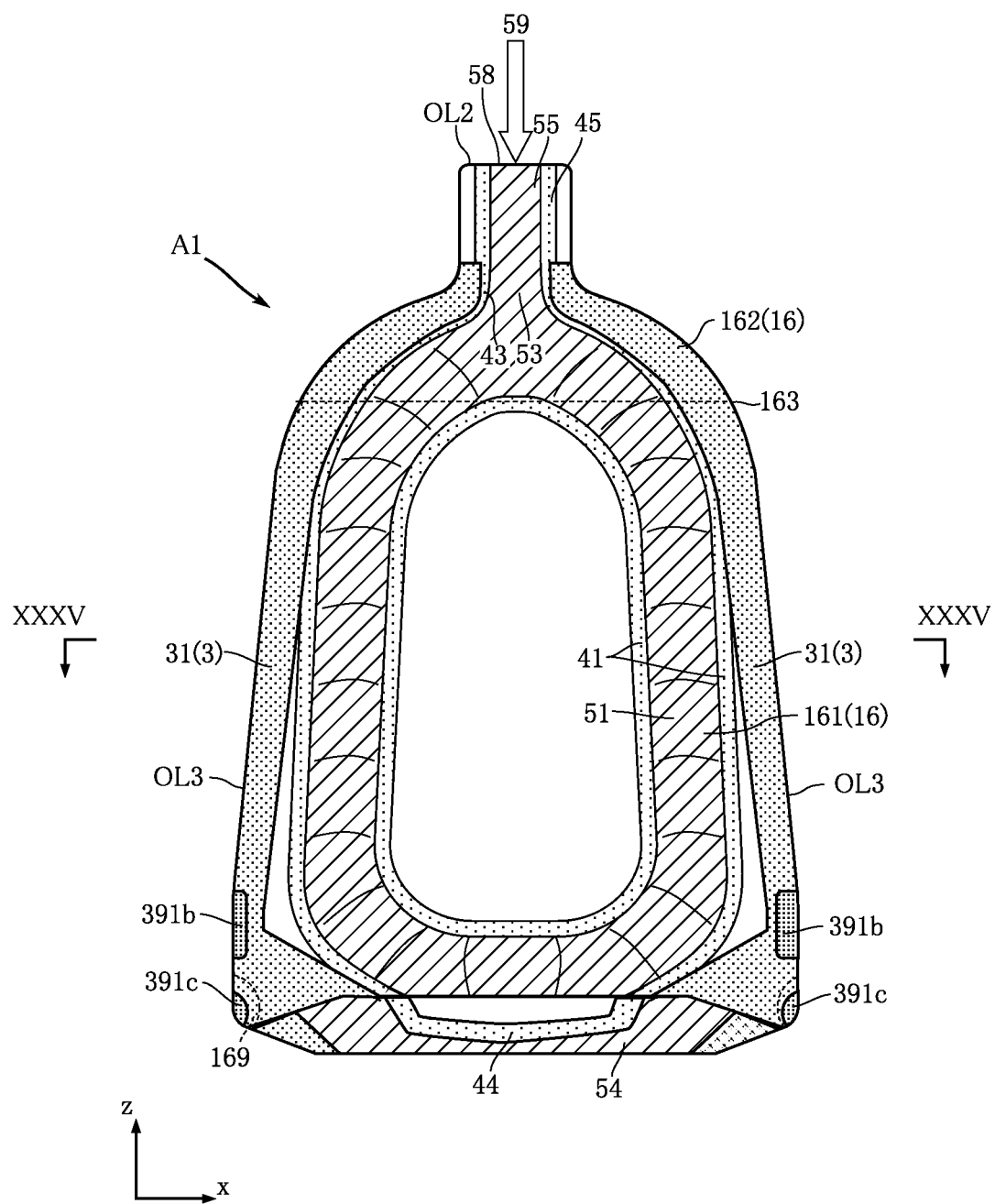
FIG. 34 is a perspective rear view illustrating a process of injecting a filler into the pouch-type packaging material that is manufactured by the pouch-type packaging material manufacturing method and the pouch-type packaging material manufacturing device according to the first embodiment of the present invention.
Figure 35:
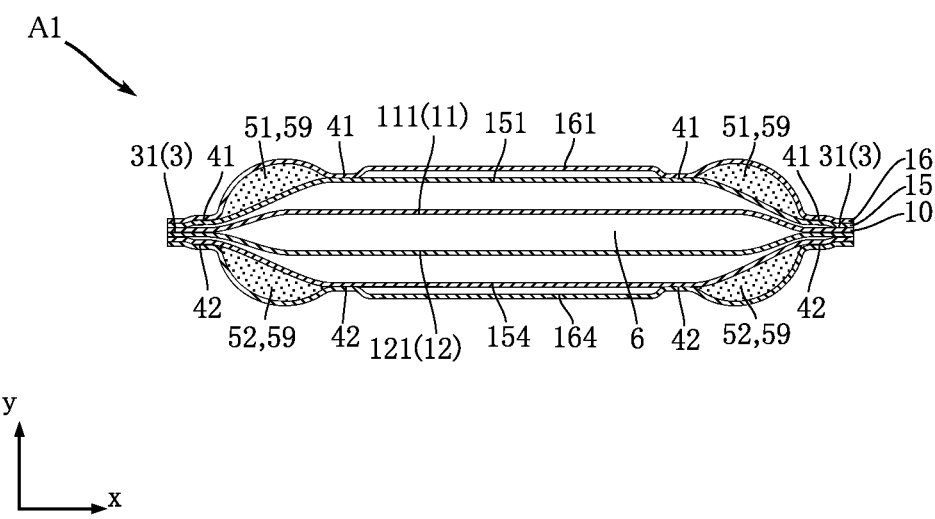
FIG. 35 is a sectional view taken along line XXXV-XXXV of FIG. 34.
Figure 36:
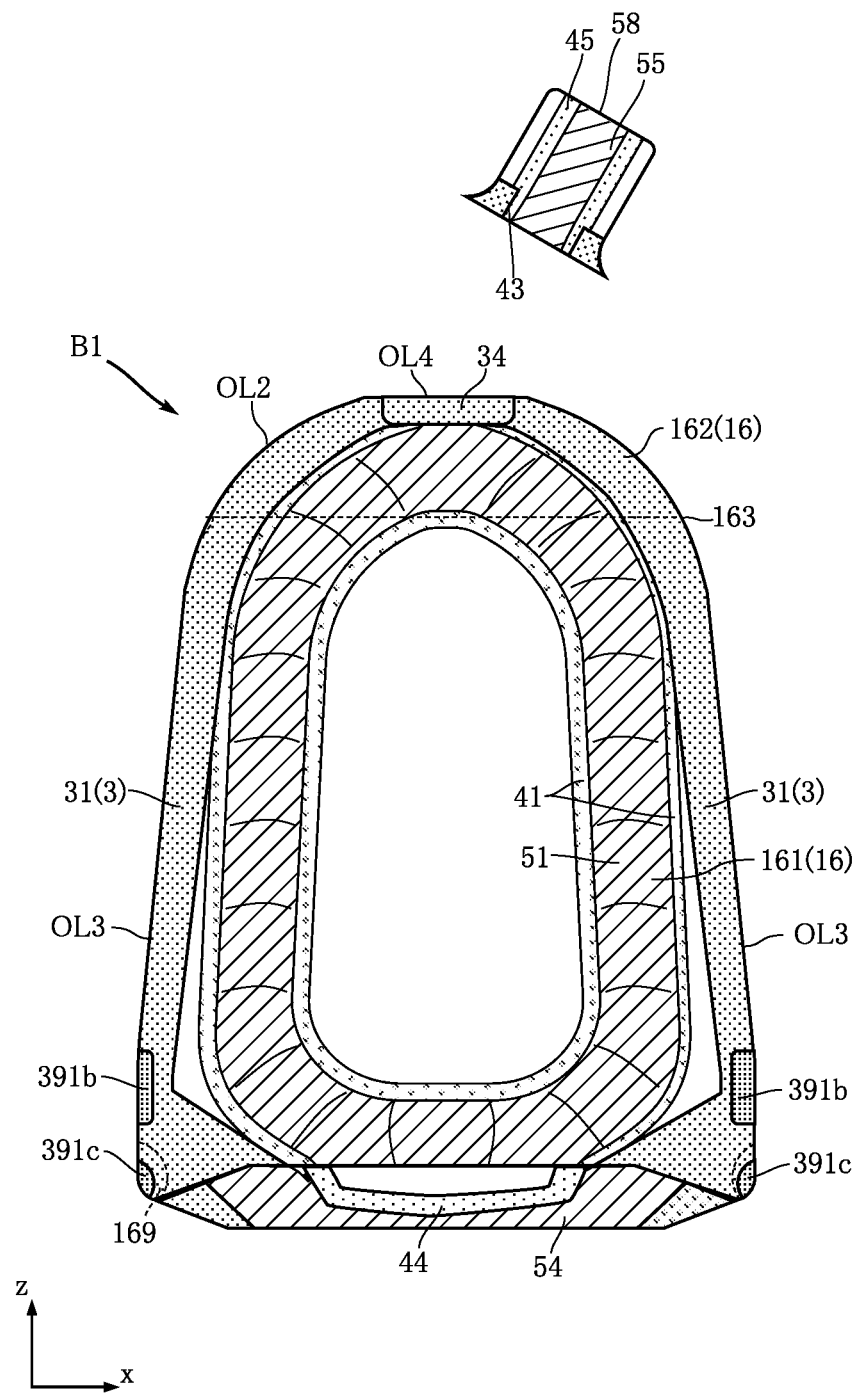
FIG. 36 is a perspective rear view illustrating a process of sealing a filler-enclosing portion of the pouch-type packaging material that is manufactured by the pouch-type packaging material manufacturing method and the pouch-type packaging material manufacturing device according to the first embodiment of the present invention.

FIGS. 34 to 36 shows the manufacture of a pouch container B1 using a pouch-type packaging material A1. As shown in FIG. 34, a filler 59 is injected into the filler-enclosing portion 5 through a fill opening 58 by using a nozzle, for example. The filler 59 can be a fluid selected from gasses, such as nitrogen and air, water, aqueous solutions and oils. In addition, powders, resins, and foam materials can be used. Any combination of the fluids, powders and so on can be used to fill the filler-enclosing portion 5. For the ease of the filling operation and the lighter weight, gasses such as nitrogen and air are more preferable fillers.

When air is used as the filler 59 and injected from the fill opening 58, the filler 59 sequentially fills out the extension filler-enclosing portion 55, the first filler-enclosing portion 51, the bottom-side filler-enclosing portion 54, the second filler-enclosing portion 52 and the top-side filler-enclosing portion 53 in the stated order. The filler-enclosing portion 5 that is inflated with the filler 59 provides the structural strength to the pouch container. In this way, the pouch container B1 is completed. Before loading of the contents 69, it is preferable to seal off the filler-enclosing portion 5 and cut off the extension structural seal 45 and the extension filler-enclosing portion 55 as shown in FIG. 36. For example, a closing seal 34 is formed across the portion where the extension filler-enclosing portion 55 is connected to the top-side structural seal 43 and the first filler-enclosing portion 51. Then, the closing seal 34 is cut along a line dividing it, thereby cutting the first sub-regions 112, 152 and 162 and the top-side sheet 13 and the top-side regions 157 and 167.

<Pouch Packaged Product C1>

Figure 37:
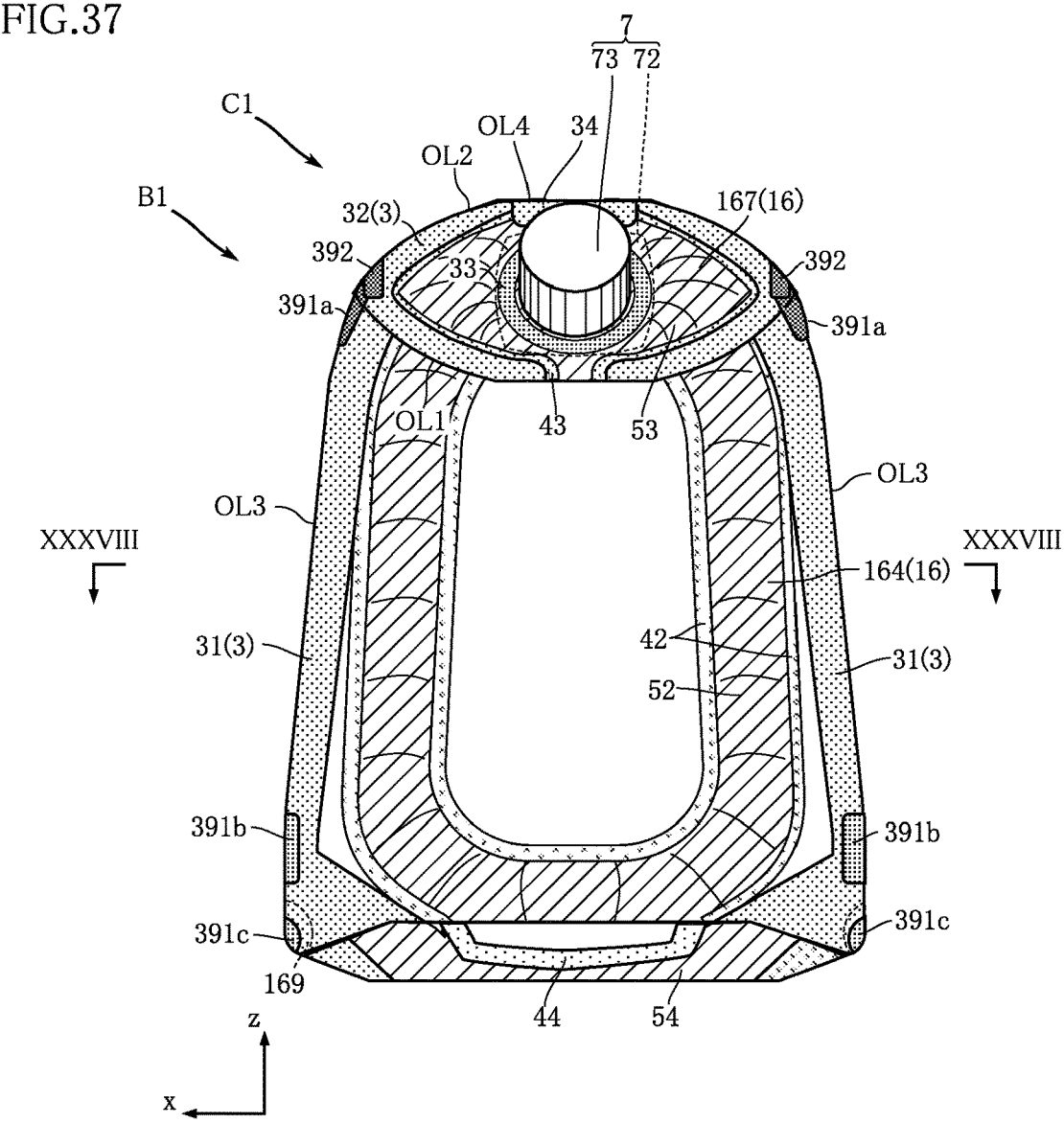
FIG. 37 is a perspective front view of a pouch container and a pouch packaged product each formed by using a pouch-type packaging material that is manufactured by the pouch-type packaging material manufacturing method and the pouch-type packaging material manufacturing device according to the first embodiment of the present invention.
Figure 38:
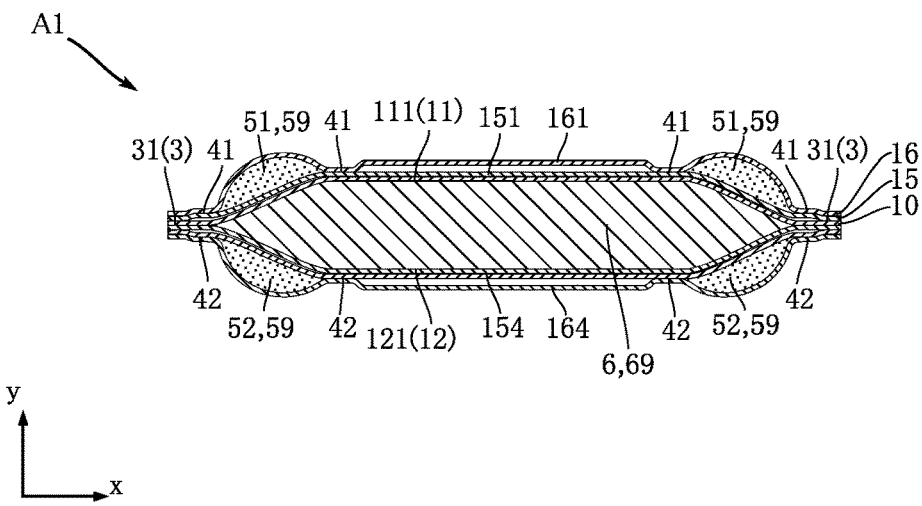
FIG. 38 is a sectional view taken along line XXXVIII-XXXVIII of FIG. 37.

FIGS. 37 and 38 show a pouch packaged product C1 formed by using a pouch container B1. According to this manufacturing method, the contents 69 are loaded as shown in the figure. Specifically, a contents loading process is performed to fill the content storage portion 6 with the contents 69, such as detergent, beverage or food, through the spout 7. Then, a subsequent process, such as a process of closing the spout 7 with a cap 73, is performed. In this way, the pouch packaged product C1 composed of the pouch container B1 filled with the filler 59 and holding the contents 69 is obtained.

Unlike the present embodiment, the pouch packaged product C1 may be manufactured by first performing the contents loading process to fill the content storage portion 6 of pouch-type packaging material A1 with the contents 69 and then performing the filler injecting process to inject the filler 59 into the filler-enclosing portion 5.

The following describes advantages of the method for manufacturing a pouch-type packaging material A1 and the pouch-type packaging material manufacturing device S1.

According to the present embodiment, the first folding process P9 is performed, followed by the first cutting process P11, the second folding process P12, and the second cutting process P14 in sequence. In the first cutting process P11, the raw material sheet 10, the first structural sheet material 150, and the second structural sheet material 160 are held generally along the z direction as shown in FIG. 14. This makes it possible to cut them along the first cutting lines CL1 that extends across the first boundary line 1130 as shown in FIG. 13. Similarly, the second cutting process P14 can cut along the second cutting line CL2 that extends across the first boundary line 1130 and intersects the first outline OL1 as shown in FIGS. 20 to 22. In this way, the top-side sheet 13 after the second cutting process P14 is already separated from the top-side sheet material 130. When a plurality of pieces of pouch-type packaging material A1 are manufactured in succession, each top-side sheet 13 has the final outer shape once the second cutting process P14 is completed. At this stage, however, each of the first body sheet material 110 and the second body sheet material 120 is a continuous, unseparated sheet in the x direction. The first body sheet material 110 and the second body sheet material 120 are cut into separate sheets in a subsequent process, but there is no need to cut the top-side sheet material 130 at this stage. This provides greater design flexibility for the shape of the top-side sheet 13.

According to the present embodiment, each first cutting line CL1 (the first outline OL1) diagonally intersects the second cutting line CL2 (the second outline OL2) at a point on or near the first boundary line 1130. Thus, each outer edge of the top-side sheet 13 in the x direction forms an acute corner, rather than a straight line perpendicular to the x direction. In addition, each first cutting line CL1 (the first outline OL1) set in the first cutting process P11 intersects the second cutting line CL2 (the second outline OL2) set in the second cutting process P14, such that the intersecting point overlaps with the top-side seal 320. Therefore, the outer edges of the top-side sheet 13 in the x direction as separated in the second cutting process P14 requires no heat sealing.

The third cutting process P15 is performed after the second cutting process P14. Therefore, each top-side sheet 13 separated in the second cutting process P14 is held together with the first body sheet material 110 and the second body sheet material 120 each of which at this stage is a continuous, unseparated sheet in the x direction. Therefore, by pulling the leading edges of the first body sheet material 110 and the second body sheet material 120 in the feed direction, the raw material sheet 10, the first structural sheet material 150, and the second structural sheet material 160, each of which is a long continuous sheet, can be appropriately forwarded in the x direction to the third cutting unit U15 where the third cutting process P15 is performed. This eliminates the need for a complicated sheet holding structure. According to the present embodiment, in addition, each third cutting line CL3 is smoothly connected to the second outline OL2 as shown in FIGS. 24, 25 and 29. The outline of each piece of pouch-type packaging material A1 can be formed without unintentional corners at the intersecting points between the second outline OL2 and the third outlines OL3.

According to the present embodiment, as shown in FIGS. 24 to 26, the third cutting process P15 of cutting along the third cutting line CL3 is performed while the pair of gripper parts 91 of the conveyor unit U21 clamp the portions of the raw material sheet 10, the first structural sheet material 150, and the second structural sheet material 160 away from the second outline OL2. Thus, once the third outline OL3 is formed, the portion enclosed by the first outline OL1, the second outline OL2 and the third outline OL3 is separated but the separated portion is still held by the gripper parts 91. That is, the portion (the pouch-type packaging material A1) separated in the third cutting process P15 is prevented from falling off. The pair of gripper parts 91 can be released when the pouch-type packaging material A1 is carried further in the x direction to, for example, a finished product collecting portion downstream of the third cutting unit U15. In this way, finished pieces of pouch-type packaging material A1 are sequentially collected.

As shown in FIG. 22, each second reinforcement seal 392 intersects the second cutting line CL2 but does not reach the first outlines OL1. The second point-seal process P13 involves a heat sealing operation during which a portion of the sealant film layer is melted and force to spread. Since the second reinforcement seals 392 are arranged as described above, the melted material will not flow out beyond the first outline OL1. In addition, each second reinforcement seal 392 intersects with the second outline OL2 and therefore reliably improves the heat seal strength around the intersection between the first outline OL1.

As shown in FIGS. 34 to 38, the pouch container B1 formed by using the pouch-type packaging material A1 has the filler-enclosing portion 5 that is filled with the filler 59. This enables the pouch container B1 to keep the shape and stand erect when the amount of the contents 69 of the pouch packaged product C1 is reduced by use.

The pouch-type packaging material manufacturing method and the pouch-type packaging material manufacturing device S1 of this embodiment enables reliable manufacturing with the efficient use of the raw material sheet 10 as well as the first structural sheet material 150 and the second structural sheet material 160. The first reinforcement seals 391 and the second reinforcement seals 392 are effective for improving the seal strength.

The method and device for manufacturing a pouch-type packaging material according to the present invention are not limited to the foregoing embodiments. The specific configuration of each part of the method and device for manufacturing a pouch-type packaging material according to the present invention can be varied in design in many ways.

The invention claimed is:

1. A method for manufacturing a pouch-type packaging material from a first body sheet material and a second body sheet material disposed face-to-face in a first direction, and a top-side sheet material disposed on a top side of the first body sheet material and the second body sheet material in a second direction perpendicular to the first direction, the method comprising:

a sheet joining process of joining a first main region of the first body sheet material and a second main region of the second body sheet material to provide a pair of side seals spaced apart from each other in a third direction perpendicular to the first direction and the second direction, and joining a first sub-region of the first body sheet material, a second sub-region of the second body sheet material, and the top-side sheet material to provide a top-side seal, the first sub-region being located on the top side of the first main region in the second direction, the second sub-region being located on the top side of the second main region in the second direction;

a first folding process of making a valley fold along a first boundary line between the first main region and the first sub-region so that the first main region and the first sub-region overlap, while the second main region and the second sub-region do not overlap;

a first cutting process of cutting the top-side sheet material, the second sub-region, the first main region, and the second main region along a first cutting line that extends from a portion where the top-side sheet material and the second sub-region overlap to a portion closer toward a bottom side in the second direction beyond the first boundary line;

a second folding process of making a valley fold along a second boundary line between the second main region and the second sub-region so that the second main region and the second sub-region overlap, while the first main region and the first sub-region do not overlap; and a second cutting process of cutting the top-side sheet material, the first sub-region, the first main region, and the second main region along a second cutting line to form a top-side sheet from the top-side sheet material, the second cutting line extending from a portion where the top-side sheet material and the first sub-region overlap to a portion closer toward the bottom side in the second direction beyond the second boundary line to intersect a first outline that is formed in the first cutting process.

2. The method according to claim 1, further comprising a third cutting process of cutting, after the second cutting process, the first main region and the second main region along a pair of third cutting lines to form a first body sheet from the first body sheet material and a second body sheet from the second body sheet material, each of the pair of third cutting lines reaching a second outline that is formed in the second cutting process and also reaching a bottom edge of each of the first main region and the second main region in the second direction.

3. The method according to claim 2, wherein in the third cutting process, the third cutting line is smoothly connected to a second outline that is formed in the second cutting process by cutting along the second cutting line.

4. The method according to claim 3, wherein the first body sheet material, the second body sheet material, and the top-side sheet material are portions of one raw material sheet.

5. The method according to claim 4, further comprising a process of preparing, before the sheet joining process, a laminate of a first structural sheet material and a second structural sheet material formed with a filler enclosing portion that is a region joined together for enclosing a filler,
wherein the sheet joining process includes joining the first structural sheet material and the second structural sheet material to an outer surface of the first body sheet material, the second body sheet material, and the top-side sheet material, and
the first folding process, the first cutting process, the second folding process, and the second cutting process are performed to fold and cut the first structural sheet material and the second structural sheet material together with the first body sheet material, the second body sheet material, and the top-side sheet material.

6. The method according to claim 3, further comprising a process of preparing, before the sheet joining process, a laminate of a first structural sheet material and a second structural sheet material formed with a filler enclosing portion that is a region joined together for enclosing a filler,
wherein the sheet joining process includes joining the first structural sheet material and the second structural sheet material to an outer surface of the first body sheet material, the second body sheet material, and the top-side sheet material, and
the first folding process, the first cutting process, the second folding process, and the second cutting process are performed to fold and cut the first structural sheet material and the second structural sheet material together with the first body sheet material, the second body sheet material, and the top-side sheet material.

7. The method according to claim 2, wherein the first body sheet material, the second body sheet material, and the top-side sheet material are portions of one raw material sheet.

8. The method according to claim 7, further comprising a process of preparing, before the sheet joining process, a laminate of a first structural sheet material and a second structural sheet material formed with a filler enclosing portion that is a region joined together for enclosing a filler,
wherein the sheet joining process includes joining the first structural sheet material and the second structural sheet material to an outer surface of the first body sheet material, the second body sheet material, and the top-side sheet material, and
the first folding process, the first cutting process, the second folding process, and the second cutting process are performed to fold and cut the first structural sheet material and the second structural sheet material together with the first body sheet material, the second body sheet material, and the top-side sheet material.

9. The method according to claim 2, further comprising a process of preparing, before the sheet joining process, a laminate of a first structural sheet material and a second structural sheet material formed with a filler enclosing portion that is a region joined together for enclosing a filler,
wherein the sheet joining process includes joining the first structural sheet material and the second structural sheet material to an outer surface of the first body sheet material, the second body sheet material, and the top-side sheet material, and
the first folding process, the first cutting process, the second folding process, and the second cutting process are performed to fold and cut the first structural sheet material and the second structural sheet material together with the first body sheet material, the second body sheet material, and the top-side sheet material.

10. The method according to claim 1, wherein the first body sheet material, the second body sheet material, and the top-side sheet material are portions of one raw material sheet.

11. The method according to claim 10, further comprising a process of preparing, before the sheet joining process, a laminate of a first structural sheet material and a second structural sheet material formed with a filler enclosing portion that is a region joined together for enclosing a filler,
wherein the sheet joining process includes joining the first structural sheet material and the second structural sheet material to an outer surface of the first body sheet material, the second body sheet material, and the top-side sheet material, and
the first folding process, the first cutting process, the second folding process, and the second cutting process are performed to fold and cut the first structural sheet material and the second structural sheet material together with the first body sheet material, the second body sheet material, and the top-side sheet material.

12. The method according to claim 1, further comprising a process of preparing, before the sheet joining process, a laminate of a first structural sheet material and a second structural sheet material formed with a filler enclosing portion that is a region joined together for enclosing a filler,
wherein the sheet joining process includes joining the first structural sheet material and the second structural sheet material to an outer surface of the first body sheet material, the second body sheet material, and the top-side sheet material, and
the first folding process, the first cutting process, the second folding process, and the second cutting process are performed to fold and cut the first structural sheet material and the second structural sheet material together with the first body sheet material, the second body sheet material, and the top-side sheet material.

* * * * *